(12) United States Patent
Monta et al.

(10) Patent No.: US 12,147,686 B2
(45) Date of Patent: Nov. 19, 2024

(54) DATA STORAGE SYSTEM

(71) Applicant: Panasonic Intellectual Property Management Co., Ltd., Osaka (JP)

(72) Inventors: Hiroki Monta, Osaka (JP); Yoshiteru Hayashi, Hyogo (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 5 days.

(21) Appl. No.: 18/122,950

(22) Filed: Mar. 17, 2023

(65) Prior Publication Data

US 2023/0305719 A1    Sep. 28, 2023

(30) Foreign Application Priority Data

Mar. 28, 2022  (JP) ................. 2022-052111
Oct. 3, 2022   (JP) ................. 2022-159739

(51) Int. Cl.
*G06F 12/00* (2006.01)
*G06F 3/06* (2006.01)

(52) U.S. Cl.
CPC .......... *G06F 3/0626* (2013.01); *G06F 3/0659* (2013.01); *G06F 3/0683* (2013.01)

(58) Field of Classification Search
CPC .... G06F 3/0626; G06F 3/0659; G06F 3/0683; G06F 3/0608; G06F 3/0673; G07C 5/0841
See application file for complete search history.

(56) References Cited

U.S. PATENT DOCUMENTS

| | | | | |
|---|---|---|---|---|
| 4,887,224 A | * | 12/1989 | Okano | G06T 9/00 |
| | | | | 358/1.9 |
| 5,371,849 A | * | 12/1994 | Peaslee | G06F 9/4812 |
| | | | | 345/553 |
| 5,878,280 A | * | 3/1999 | Lucht | G06F 3/061 |
| | | | | 348/E7.071 |
| 9,746,939 B2 | * | 8/2017 | Baek | G06F 3/0425 |
| 2007/0005833 A1 | * | 1/2007 | Seto | G06F 13/385 |
| | | | | 710/52 |

(Continued)

FOREIGN PATENT DOCUMENTS

| | | | | |
|---|---|---|---|---|
| CN | 202917178 U | * | 5/2013 | |
| JP | H10144829 A | * | 5/1998 | |

(Continued)

OTHER PUBLICATIONS

Office Action mailed on Feb. 27, 2024 for corresponding Japanese patent application No. 2022-159739, together with English translation thereof.

*Primary Examiner* — Shawn X Gu
*Assistant Examiner* — Mohammad S Hasan
(74) *Attorney, Agent, or Firm* — GREENBLUM & BERNSTEIN, P.L.C.

(57) ABSTRACT

A data storage system is a data storage system which is mounted on a moving body. The data storage system includes: a plurality of ECUs which are connected to a network in the moving body; a shared storage device into which data is writable by each of the plurality of ECUs; and a shared priority controller which is connected between the plurality of ECUs and the shared storage device, and controls an order of priority in which data is written into the shared storage device from each of the plurality of ECUs.

18 Claims, 19 Drawing Sheets

(56) References Cited

U.S. PATENT DOCUMENTS

| | | | |
|---|---|---|---|
| 2010/0312935 A1* | 12/2010 | Higuchi | G06F 13/374 |
| | | | 710/120 |
| 2013/0067275 A1* | 3/2013 | Watanabe | G06F 11/1092 |
| | | | 714/6.24 |
| 2016/0275028 A1* | 9/2016 | Ishikawa | G06F 13/4068 |
| 2018/0052694 A1* | 2/2018 | Lee | G06F 13/4022 |
| 2018/0126930 A1 | 5/2018 | Ando et al. | |
| 2020/0226078 A1 | 7/2020 | Tanaka et al. | |
| 2020/0233613 A1* | 7/2020 | Tokiwa | G11C 16/32 |
| 2022/0309418 A1* | 9/2022 | Chivukula | G06F 8/71 |
| 2023/0063930 A1* | 3/2023 | Ichida | G06V 20/597 |

FOREIGN PATENT DOCUMENTS

| | | | | |
|---|---|---|---|---|
| JP | 2005-316609 A | | 11/2005 | |
| JP | 2010282405 A | * | 12/2010 | G06F 13/374 |
| JP | 2018-070121 A | | 5/2018 | |
| JP | 2020113137 A | * | 7/2020 | G06F 12/0806 |
| JP | 2021-174413 A | | 11/2021 | |
| KR | 20200017290 A | * | 2/2020 | |

* cited by examiner

FIG. 4

| Access classification | Processing classification | Processing details | Order of priority |
|---|---|---|---|
| ASIL write | Event log recording | - ID1-1: recording of logs before and after occurrence of detection of risk by obstacle detection | 1 |
| | Event image recording | - ID1-2: recording of videos or detection analysis images before and after occurrence of detection of risk by obstacle detection | |
| Non-ASIL write | Anytime log recording | - ID2-1: driving log (position information, etc.)<br>- ID2-2: own vehicle information (vehicle state, etc.)<br>- ID2-3: passenger state (blood pressure, etc.) | 2 |
| | Anytime image recording | - ID2-4: recording of driving video | |
| Communication write | Download | - ID3-1: update of software<br>- ID3-2: management data from server | 3 |

FIG. 5

| Access classification | Processing classification | Processing details | The number of stored data | Addresses in temporary memory (ascending order) Start address | The number of sequential addresses |
|---|---|---|---|---|---|
| ASIL write | Event log recording | - ID1-1: recording of logs before and after occurrence of detection of risk by obstacle detection | 2 | 0x0000_0000 | 8 |
| | | | | 0x0000_0010 | 8 |
| | Event image recording | - ID1-2: recording of videos or detection analysis images before and after occurrence of detection of risk by obstacle detection | 2 | 0x0000_0008 | 2 |
| | | | | 0x0000_001d | 4 |
| Non-ASIL write | Anytime image recording | - ID2-4: recording of driving video | 2 | 0x0000_0040 | 8 |
| | | | | 0x0000_004a | 8 |
| | Anytime log recording | - ID2-1: driving log (position information, etc.) | 2 | 0x0000_0048 | 2 |
| | | | | 0x0000_0052 | 4 |
| | | - ID2-2: own vehicle information (vehicle state, etc.) | 3 | 0x0000_000a | 2 |
| | | | | 0x0000_0018 | 3 |
| | | | | 0x0000_0004 | 4 |
| | | - ID2-3: passenger state (blood pressure, etc.) | 1 | 0x0000_000c | 4 |
| Communication write | Download | - ID3-1: update of software | 2 | 0x0000_0020 | 8 |
| | | | | 0x0000_0030 | 8 |
| | | - ID3-2: management data from server | 2 | 0x0000_0038 | 8 |
| | | | | 0x0000_0028 | 8 |

FIG. 7

| Access classification | Processing classification | Processing details | Addresses in temporary memory | |
|---|---|---|---|---|
| | | | Start address | End address |
| ASIL write | Event log recording | - ID1-1: recording of logs before and after occurrence of detection of risk by obstacle detection | 0x0010_0000 | 0x001F_FFFF |
| | Event image recording | - ID1-2: recording of videos or detection analysis images before and after occurrence of detection of risk by obstacle detection | 0x0200_0000 | 0x07FFFF_FFFF |
| Non-ASIL write | Anytime image recording | - ID2-4: recording of driving video | 0x0800_0000 | 0x0EFF_FFFF |
| | Anytime log recording | - ID2-1: driving log (position information, etc.) | 0xF000_0000 | 0xF01F_FFFF |
| | | - ID2-2: own vehicle information (vehicle state, etc.) | 0xF020_0000 | 0xF03F_FFFF |
| | | - ID2-3: passenger state (blood pressure, etc.) | 0xF040_0000 | 0xF05F_FFFF |
| Communication write | Download | - ID3-1: update of software | 0xF060_0000 | 0xF07F_FFFF |
| | | - ID3-2: management data from server | 0xF080_0020 | 0xF09F_FFFF |

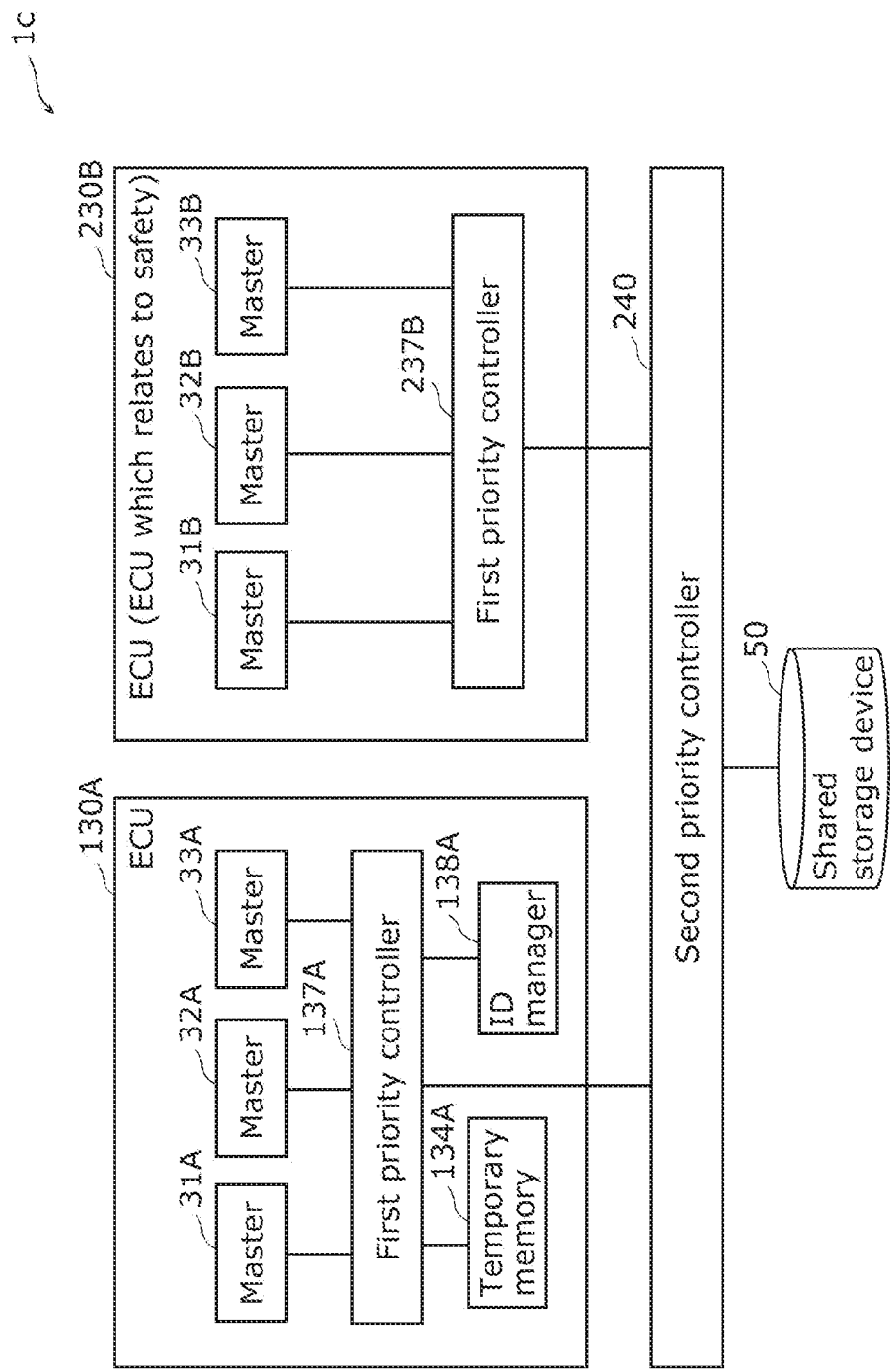

FIG. 9

| Access classification | Processing classification | Processing details | Order of priority |
|---|---|---|---|
| ASIL write | Event log recording | - recording of logs before and after occurrence of detection of risk by obstacle detection | 1 |
| | Event image recording | - recording of videos or detection analysis images before and after occurrence of detection of risk by obstacle detection | 2 |
| Non-ASIL write | Anytime log recording | - ID3-1: driving log (position information, etc.)<br>- ID3-2: own vehicle information (vehicle state, etc.)<br>- ID3-3: passenger state (blood pressure, etc.) | 3 |
| | Anytime image recording | - ID4-1: recording of driving video | 4 |
| Communication write | Download | - ID5-1: update of software<br>- ID5-2: management data from server | 5 |

FIG. 10

| Access classification | Processing classification | Processing details | The number of stored data | Addresses in temporary memory (ascending order) Start address | The number of sequential addresses |
|---|---|---|---|---|---|
| Non-ASIL write | Anytime image recording | - ID4-1: recording of driving video | 2 | 0x0000_0000 | 8 |
|  |  |  |  | 0x0000_0010 | 8 |
|  | Anytime log recording | - ID3-1: driving log (position information, etc.) | 2 | 0x0000_0008 | 2 |
|  |  |  |  | 0x0000_001d | 4 |
|  |  | - ID3-2: own vehicle information (vehicle state, etc.) | 3 | 0x0000_000a | 2 |
|  |  |  |  | 0x0000_0018 | 3 |
|  |  |  |  | 0x0000_0004 | 4 |
|  |  | - ID3-3: passenger state (blood pressure, etc.) | 1 | 0x0000_000c | 4 |
| Communication write | Download | - ID5-1: update of software | 2 | 0x0000_0020 | 8 |
|  |  |  |  | 0x0000_0030 | 8 |
|  |  | - ID5-2: management data from server | 2 | 0x0000_0038 | 8 |
|  |  |  |  | 0x0000_0028 | 8 |

FIG. 14

| Access classification | Processing classification | Processing details | Order of priority | Selection of storage memory |
|---|---|---|---|---|
| ASIL write | Event log recording | - recording of logs before and after occurrence of detection of risk by obstacle detection | 1 | pSLC/SLC memory (nonoverwritable region) |
| | Event image recording | - recording of videos or detection analysis images before and after occurrence of detection of risk by obstacle detection | 2 | MLC/TLC memory (nonoverwritable region) |
| Non-ASIL write | Anytime log recording | - ID3-1: driving log (position information, etc.)<br>- ID3-2: own vehicle information (vehicle state, etc.)<br>- ID3-3: passenger state (blood pressure, etc.) | 3 | MLC/TLC memory (overwritable region) |
| | Anytime image recording | - ID4-1: recording of driving video | 4 | MLC/TLC memory (overwritable region) |
| Communication write | Download | - ID5-1: update of software<br>- ID5-2: management data from server | 5 | pSLC/SLC memory (nonoverwritable region) |

FIG. 17

| VC | Degree of priority | Access classification | Processing classification | Processing details |
|---|---|---|---|---|
| 7 | High | ASIL write | Event log recording | - ID1-1: recording of logs before and after occurrence of detection of risk by obstacle detection |
| 6 | | | Event image recording | - ID1-2: recording of videos or detection analysis images before and after occurrence of detection of risk by obstacle detection |
| 5 | | Non-ASIL write | Anytime image recording | - ID2-4: recording of driving video |
| 4 | | | Anytime log recording | - ID2-1: driving log (position information, etc.) |
| 3 | | | | - ID2-2: own vehicle information (vehicle state, etc.) |
| 2 | | | | - ID2-3: passenger state (blood pressure, etc.) |
| 1 | | Communication | Download | - ID3-1: update of software |
| 0 | Low | | | - ID3-2: management data from server |

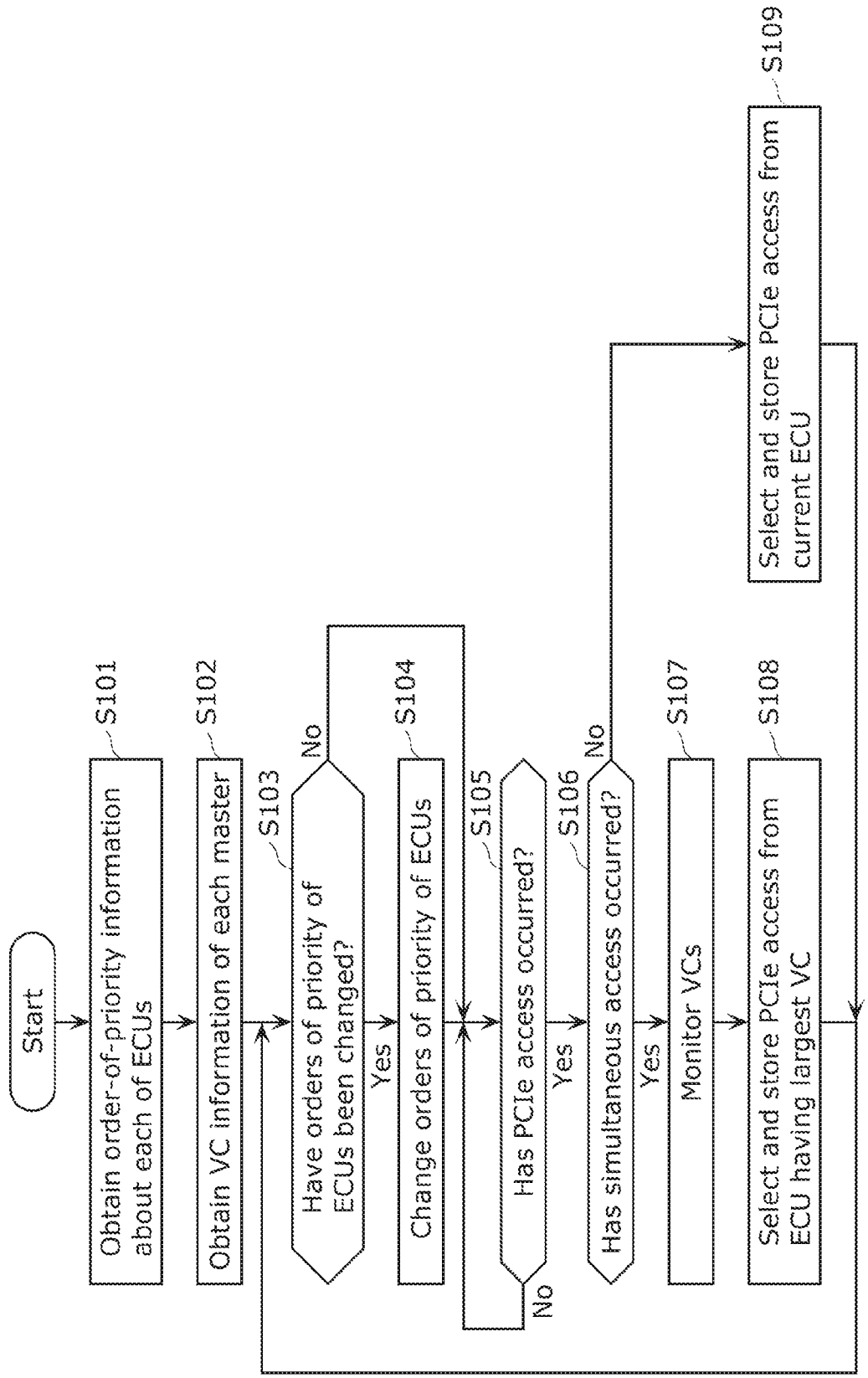

DATA STORAGE SYSTEM

CROSS REFERENCE TO RELATED APPLICATIONS

The present application is based on and claims priority of Japanese Patent Application No. 2022-052111 filed on Mar. 28, 2022, and priority of Japanese Patent Application No. 2022-159739 filed on Oct. 3, 2022.

FIELD

The present disclosure relates to a data storage system.

BACKGROUND

Various data have been conventionally stored in data storage (storage device). Such data includes logs and data of videos, etc., obtained when predetermined events such as collisions and abrupt braking have occurred and logs and data of videos, etc., obtained normally. When the vehicle is a vehicle which mounts an automatic driving function, the amount of data that should be stored is huge. In view of this, Patent Literature 1 discloses a technique for reducing the amount of data to be stored by changing the data to be stored into data storage according to an automatic driving mode level.

CITATION LIST

Patent Literature

PTL 1: Japanese Unexamined Patent Application Publication No. 2021-174413

SUMMARY

However, the technique disclosed in Patent Literature 1 has a room for improvement.

In view of this, the present disclosure provides a data storage system which enables further improvement.

A data storage system according to an aspect of the present disclosure is a data storage system which is mounted on a moving body, the data storage system includes: a plurality of electronic control devices which are connected to a network in the moving body; a shared storage device into which data is writable by each of the plurality of electronic control devices; and a shared priority controller which is connected between the plurality of electronic control devices and the shared storage device, and controls an order of priority in which data is written into the shared storage device from each of the plurality of electronic control devices.

According to the aspect of the present disclosure, it is possible to implement a data storage system which enables further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 4 is a diagram indicating an ID management table according to Embodiment 2.

FIG. 5 is a diagram indicating a data management table according to Embodiment 2.

FIG. 7 is a diagram illustrating an example of region division in a temporary memory according to a variation of Embodiment 2.

FIG. 8 is a block diagram illustrating a functional configuration of a data storage system according to Embodiment 3.

FIG. 9 is a diagram indicating an ID management table according to Embodiment 3.

FIG. 10 is a diagram indicating a data management table according to Embodiment 3.

FIG. 14 is a diagram indicating an ID management table according to Variation 2 of Embodiment 3.

FIG. 17 is a diagram indicating a VC setting table according to Embodiment 5.

FIG. 18 is a flow chart indicating an operation that is performed by the data storage system according to Embodiment 5.

DESCRIPTION OF EMBODIMENTS

Figure 1:
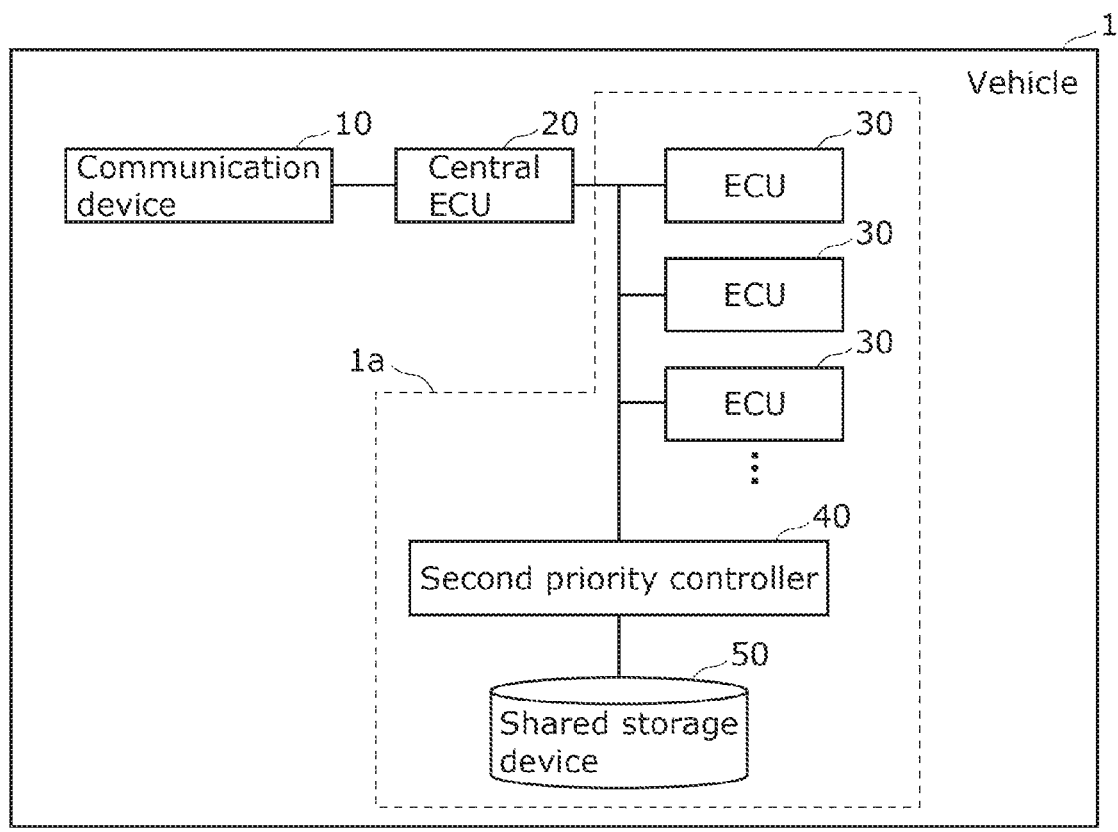
FIG. 1 is a block diagram illustrating a functional configuration of a vehicle according to Embodiment 1.

A data storage system according to an aspect of the present disclosure is a data storage system which is mounted on a moving body, the data storage system includes: a plurality of electronic control devices which are connected to a network in the moving body; a shared storage device into which data is writable by each of the plurality of electronic control devices; and a shared priority controller which is connected between the plurality of electronic control devices and the shared storage device, and controls an order of priority in which data is written into the shared storage device from each of the plurality of electronic control devices.

With this, the data storage system is capable of reducing the number of storage devices compared with the case in which each of the plurality of electronic control devices has a storage device. Thus, according to the data storage system, it is possible to implement a low-cost data storage system.

In addition, for example, each of the plurality of electronic control devices include: a plurality of masters including a first master which performs write processing of first data into the shared storage device, and a second master which performs write processing of second data into the shared storage device, the second data being different from the first data; a plurality of temporary memories which are connected respectively to the plurality of masters; and a dedicated priority controller which controls the order of priority in which data is written into the shared storage device from each of the plurality of masters.

In this way, according to the data storage system, the temporary memory is connected to each of the plurality of masters, and thus it is possible to prevent data from being lost when a collision occurs when two or more of the plurality of first masters access the shared storage device to write the data of the two or more of the plurality of electronic control devices.

In addition, for example, each of the plurality of electronic control devices include one or more first electronic control devices, and each of the one or more first electronic control devices may include: a plurality of first masters including a first master which performs write processing of first data into the shared storage device, and a first master which performs write processing of second data into the shared storage device, the second data being different from the first data; a first temporary memory into which data of each of the plurality of first masters is writable; and a first dedicated priority controller which is connected to the plurality of first masters and to the first temporally memory, and includes a first dedicated priority controller which controls the order of priority in which data is written into the shared storage device from each of the plurality of first masters.

In this way, according to the data storage system, the temporary memory can be shared by the plurality of first masters, and thus it is possible to implement a lower-cost data storage system.

In addition, for example, each of the one or more first electronic control devices may include a first manager which manages first priority information in which a type of data and the order of priority in which data is written into the shared storage device is associated with each other, and when the collision occurs when the two or more of the plurality of first masters access the shared storage device to write the data, based on the first priority information, the first dedicated priority controller may control the order of priority in which data is written.

In this way, the first dedicated priority controller is capable of controlling the order of priority in which data is written based on the first priority information.

In addition, for example, when the collision occurs when the two or more of the plurality of first masters access the shared storage device to write the data, based on the first priority information, the first dedicated priority controller may assign, to low-priority data which has a low order of priority, information indicating an order of priority of the low-priority data, and write the low-priority data into the first temporary memory.

In this way, according to the data storage system, it is possible to reliably write high-priority data in write access which has a high order of priority (high safety) into the shared storage device, and to prevent low-priority data in write access which has a low order of priority (low safety) from being lost. In addition, since the data to be written into the first temporary memory is assigned the information indicating the order of priority, it is possible to identify the data (for example, determines from which master the data comes).

In addition, for example, the first temporary memory may include memory regions which have been divided on a per-data basis in advance, and when the collision occurs when the two or more of the plurality of first masters access the shared storage device to write the data, based on the first priority information, the first dedicated priority controller may write low-priority data which has a low order of priority into a memory region corresponding to the low-priority data in the first temporary memory.

In this way, according to the data storage system, there is no need to assign data information indicating the order of priority when writing the data into the first temporary memory, and thus it is possible to reduce the capacity of the first temporary memory. The reduction in the capacity of the first temporary memory leads to reduction in cost for the data storage system.

In addition, for example, the plurality of electronic control devices may include one or more second electronic control devices which relate more to safety of the moving body than the one or more first electronic control devices, and each of the one or more second electronic control devices may include: a plurality of second masters including a second master which performs write processing of third data into the shared storage device, and a second master which performs write processing of fourth data into the shared storage device, the fourth data being different from the third data; and a second dedicated priority controller which controls the order of priority in which data is written into the shared storage device from each of the plurality of second masters.

In this way, the data storage system is capable of storing data of the one or more second electronic control devices which relate to safety into the shared storage device, and thus is capable of reducing the number of storage devices compared to the case in which each of the one or more second electronic control devices has a storage device. Thus, according to the data storage system, it is possible to implement a lower-cost data storage system.

In addition, for example, each of the one or more second electronic control devices may include a second manager which manages second priority information in which a type of data and the order of priority in which data is written into the shared storage device is associated with each other, and when the collision occurs when the two or more of the plurality of second masters access the shared storage device to write the data, based on the second priority information, the second dedicated priority controller may control the order of priority in which data is written.

In this way, the second dedicated priority controller is capable of controlling the order of priority in which data is written based on the second priority information.

In addition, for example, the data storage system may further include: a second temporary memory into which data of each of the plurality of second masters is writable, wherein the second temporary memory may be duplexed.

In this way, according to the data storage system, it is possible to increase credibility of the data of the one or more second electronic control devices which relate to safety.

In addition, for example, the second dedicated priority controller may control the order of priority by most prioritizing safety when the collision occurs when the two or more of the plurality of second masters access the shared storage device to write the data.

In this way, according to the data storage system, a temporary memory does not always need to be connected to the plurality of second masters (masters which relate to safety), it is possible to implement a lower-cost data storage system.

In addition, for example, the plurality of electronic control devices may include: one or more first electronic control devices; and one or more second electronic control devices which relate more to safety of the moving body than the one or more first electronic control devices, each of the one or more first electronic control devices may include: a plurality of masters including a first master which performs write processing of first data into the shared storage device, and a first master which performs write processing of second data into the shared storage device, the second data being different from the first data; and a first dedicated priority controller which controls the order of priority in which data is written into the shared storage device from each of the plurality of first masters, each of the one or more second electronic control devices may include: a plurality of second masters including a second master which performs write processing of third data into the shared storage device, and a second master which performs write processing of fourth data into the shared storage device, the fourth data being different from the third data; and a second dedicated priority controller which controls, by most prioritizing safety, the order of priority in which data is written into the shared storage device from each of the plurality of second masters, and the shared priority controller may control the order of priority by most prioritizing safety when the collision occurs when the two or more of the plurality of electronic control devices access the shared storage device to write the data of the two or more of the plurality of electronic control devices.

In this way, according to the data storage system, a temporary memory does not always need to be connected to each of the plurality of first masters and the plurality of second masters, it is possible to implement a lower-cost data storage system.

In addition, for example, the shared priority controller may include: a determiner which determines whether data obtained from each of the plurality of electronic control devices is log data; and an aggregator which aggregates data which has been determined to be log data by the determiner, and writes the data aggregated collectively into the shared storage device.

In this way, according to the data storage system, it is possible to reduce the number of times of writing log data that requires a data amount smaller than a data amount required for video, etc., into the shared storage device, and thus it becomes possible to extend the lifetime of the shared storage device. According to the data storage system, for example, when the data storage system is used for a vehicle which has a long lifecycle, it is possible to reduce the number of times of exchanging shared storage devices, which provides a cost advantage in the maintenance of the data storage system.

In addition, for example, the shared storage device may include a first memory and a second memory, the first memory may have a larger capacity than the second memory, and the second memory may be more durable than the first memory.

In this way, the shared storage device is capable of achieving both capacity reduction and durability.

In addition, for example, the shared priority controller may further include a selector which selects one of the first memory and the second memory as a destination into which data obtained from each of the plurality of electronic control devices is to be written, based on the information indicating the order of priority in which data is written into the shared storage device, the information being included in the data obtained from each of the plurality of electronic control devices.

In this way, the selector is capable of selecting the memory using the information indicating the order of priority included in the header part of the data without parsing the data part of the data, and thus is capable of providing an improved throughput in the data storage system.

In addition, for example, the information indicating the order of priority may be indicated as a register value for quality of service (QoS) control included in the data obtained from each of the plurality of electronic control devices.

In this way, according to the data storage system, it is possible to provide an improved throughput in the data storage system utilizing the register value for QoS control.

In addition, for example, the shared storage device may include a substrate and a connector, the first memory may be detachably attached to the substrate via the connector, and the second memory may be non-detachably attached to the substrate.

In this way, according to the data storage system, for example, when the data storage system is used for a vehicle which has a long lifecycle, it is possible to easily exchange first memories, which provides a cost advantage in the maintenance of the data storage system.

In addition, for example, communication may be performed between the plurality of electronic control devices and the shared storage device according to the peripheral component interconnect express (PCIe) standard, and the shared priority controller may include a VC monitor which monitors a virtual channel (VC) analysis result of collision data when the collision has occurred when the two or more of the plurality of electronic control devices access the shared storage device to write the data of the two or more of the plurality of electronic control devices.

In this way, according to the data storage system, when the VC analysis result of the collision data is used for controlling the order of priority, it is possible to reliably store important data even when communication is performed according to the PCIe standard.

In addition, for example, the VC monitor may control the order of priority in which data is written into the shared storage device based on the VC analysis result of the collision data when the collision has occurred when the two or more of the plurality of electronic control devices access the shared storage device to write the data.

In this way, according to the data storage system, it is possible to control the order of priority based on the VC analysis result, it is possible to store important data more reliably even when communication is performed according to the PCIe standard.

In addition, for example, communication may be performed between the plurality of electronic control devices and the shared storage device according to the peripheral component interconnect express (PCIe) standard, and the dedicated priority controller: after obtaining the first data from the first master, may store first information according to the first master into a virtual channel (VC) of a header part of the first data; and after obtaining the second data from the second master, may store second information according to the second master into a VC of a header part of the second data. In addition, for example, the one or more first electronic control devices and the shared storage device may perform communication according to the PCIe standard, the first dedicated priority controller: after obtaining the first data from the first master which performs write processing of the first data into the shared storage device, may store first information according to the first master into a virtual channel (VC) of a header part of the first data; and after obtaining the second data from the first master which performs write processing of the second data into the shared storage device, may store second information according to the first master into a VC of a header part of the second data.

In this way, according to the data storage system, when an access collision has occurred in the shared priority controller, it is possible to store important data more reliably by using information (for example, values) stored in the VCs for control of the orders of priority even when communication is performed according to the PCIe standard.

Hereinafter, embodiments are described in detail with reference to the drawings.

The embodiments described below each indicate a general or specific example. The numerical values, shapes, materials, elements, the arrangement and connection of the elements, steps, the order of the steps, etc., in the following embodiments are mere examples, and therefore are not intended to limit the scope of the present disclosure. Among elements in the following embodiments, those not recited in any one of the independent claims are described as optional elements.

It is to be noted that the respective diagrams are schematic diagrams, and are not necessarily precisely illustrated. Accordingly, for example, scales in the respective diagrams are not always the same. In each of the diagrams, elements that are substantially the same as those in any of the other diagrams are assigned with the same reference signs, and overlapping descriptions are omitted or simplified.

In the present specification, terms indicating relationships between elements such as "the same", numerical values and numerical value ranges refer not only to their strict meanings, but each encompass a range of substantially equivalents, such as a range of deviations of a few percent (for example, approximately 10%).

Embodiment 1

[1-1. Configuration of Vehicle]

FIG. 1 is a block diagram illustrating a functional configuration of vehicle 1 according to the present embodiment. FIG. 1 illustrates an on-vehicle network system which is mounted on vehicle 1. Although an example in which data storage system 1a is mounted on vehicle 1 that is one example of a moving body, hereinafter, it is to be noted that a moving body here is not limited to vehicle 1, and may be any of a flying body such as a drone, a vessel, a train, or the like. Alternatively, although vehicle 1 is an automatic driving vehicle, vehicle 1 may be a vehicle which is a manual driving vehicle, or a vehicle which is switchable between automatic driving and manual driving.

It is to be noted that since the moving body is vehicle 1, it is possible to reduce cost for data storage system 1a that is mounted onto vehicle 1. Accompanied by automatic driving, etc., of vehicle 1, it is assumed that the number of electronic control devices which are mounted on vehicle 1 increases also in the future. For example, it is considered that mounting data storage system 1a according to the present embodiment onto vehicle 1 which includes such a large number of electronic control devices particularly provides advantageous effects.

As illustrated in FIG. 1, vehicle 1 includes communication device 10, central electronic control unit (ECU) 20, a plurality of ECUs 30, second priority controller 40, and shared storage device 50. In the embodiment, it is possible to use a standard that is for example Ethernet (registered trademark), peripheral component interconnect express (PCIe), or the like, for an interface between the plurality of ECUs 30 (for example, first priority controllers to be described later) and shared storage device 50. In other words, communication between the plurality of ECUs 30 (for example, first priority controllers to be described later) and shared storage device 50 is performed according to the standard that is for example Ethernet, PCIe, or the like.

Hereinafter, a description is given assuming that communication between the plurality of ECUs 30 (for example, the first priority controllers to be described later) and shared storage device 50 is performed according to the Ethernet standard. In other words, communication between the plurality of ECUs 30 (for example, the first priority controllers to be described later) and shared storage device 50 is performed using Ethernet frames.

Communication device 10 includes a communication interface between vehicle 1 and an external network. For example, communication device 10 transmits information that is notified from central ECU 20 to an external device (for example, a server) via the external network. In addition, communication device 10 receives a software update program from the external device. Communication device 10 is also referred to as, for example, a telematic control unit (TCU).

Central ECU 20 is an ECU which takes a key role in vehicle 1, and has various kinds of applications which achieve, when being operated, the respective functions of vehicle 1. Central ECU 20 notifies the external device of an anomaly which has occurred inside vehicle 1. For example, central ECU 20 may transmit information recorded in shared storage device 50 to the external device via communication device 10.

ECUs 30 are connected to the network inside vehicle 1, and control the respective units of vehicle 1. Non-limiting Examples of ECUs 30 include ECUs which relate to automatic driving, ECUs which notify information obtained from the respective sensors mounted on vehicle 1, ECUs which control an actuator which relates to driving of vehicle 1, etc.

Each of central ECU 20 and ECUs 30 is a device which includes, for example, a processor (micro processor), a digital circuit such as a memory, an analog circuit, a communication circuit, etc. Examples of memories include read only memories (ROM), random access memories (RAM), or the like, and each of the memories is capable of storing a control program (computer program) that is executed by a processor. For example, the ECUs achieve various kinds of their functions by means of the processor operating according to the control program. The computer program is configured to combine a plurality of instruction codes to the processor in order to achieve predetermined functions.

It is to be noted that the number of ECUs 30 included in vehicle 1 is not particularly limited as long as the number of ECUs 30 is 2 or larger.

Second priority controller 40 is connected between the plurality of ECUs 30 and shared storage device 50, and controls the order of priority in which data is written from the plurality of ECUs 30 to shared storage device 50. In the present embodiment, second priority controller 40 controls data writing from the plurality of ECUs into shared storage device 50 under round robin control. Second priority controller 40 is one example of a shared priority controller.

Shared priority controller 50 is connected to each of the plurality of ECUs 30 via an on-vehicle network, and is a storage device capable of writing data from the plurality of ECUs 30. In the present embodiment, shared priority controller 50 is capable of writing also data from central ECU 20. Shared priority controller 50 is a non-volatile storage device.

Shared priority controller 50 is configured to include a substrate and a plurality of non-volatile semiconductor memories arranged on the substrate.

Data storage system 1a is configured to include the plurality of ECUs 30, second priority controller 40, and shared storage device 50. It is to be noted that data storage system 1a may include central ECU 20.

Figure 2:
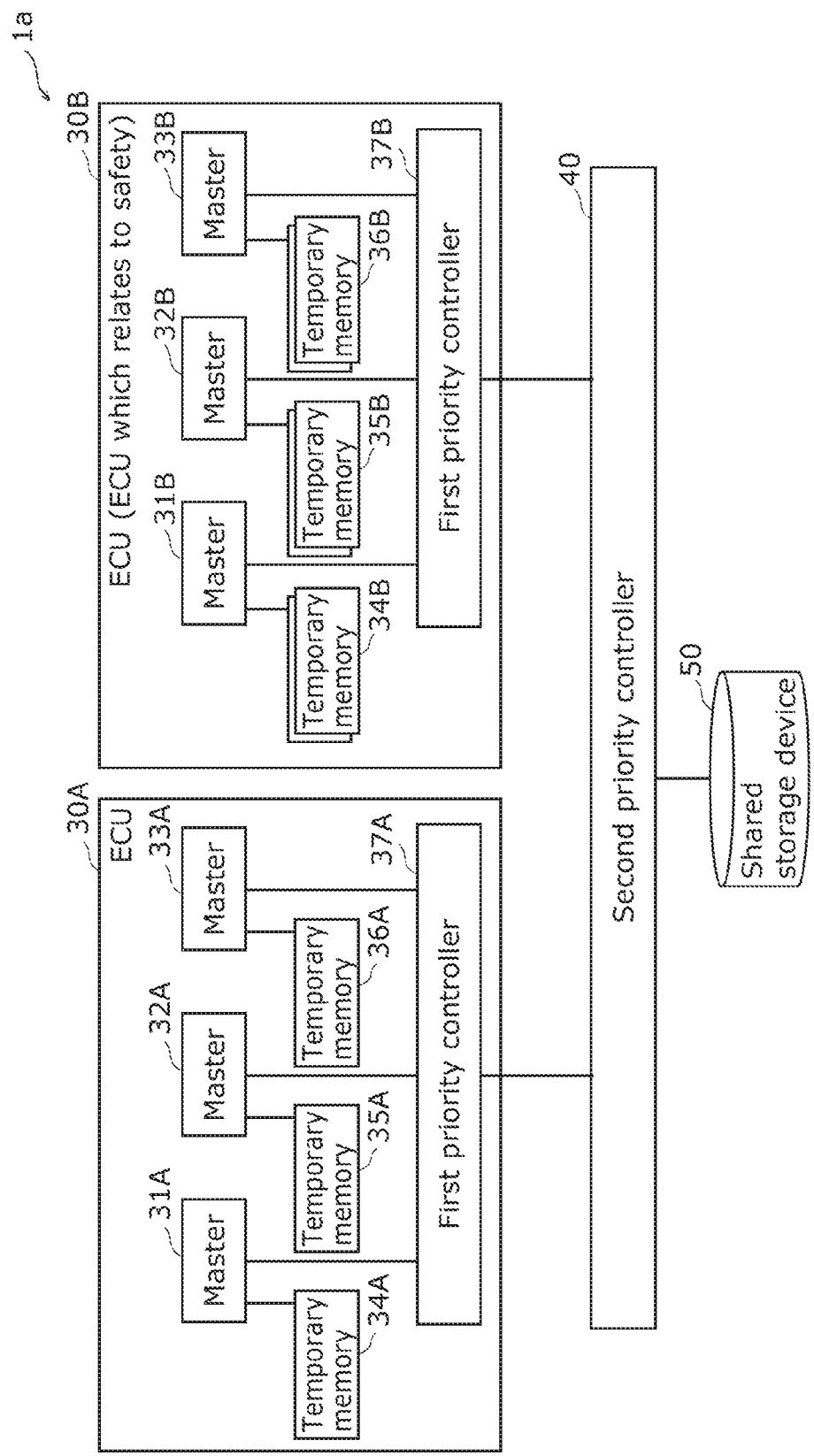
FIG. 2 is a block diagram illustrating a functional configuration of a data storage system according to Embodiment 1.

Hereinafter, a configuration of data storage system 1a is described with reference to FIG. 2. FIG. 2 is a block diagram illustrating a functional configuration of data storage system 1a according to the present embodiment. Hereinafter, a description is given of using two ECUs 30A and 30B as representatives of the plurality of ECUs 30. ECU 30A is one example of each of the electronic control device and a first electronic control device, and ECU 30B is one example of each of an electronic control device and a second electronic control device.

As illustrated in FIG. 2, data storage system 1a includes ECUs 30A and 30B, second priority controller 40, and shared storage device 50.

ECU 30A is an ECU which does not relate to safety, and includes a plurality of maters (masters 31A, 32A, and 33A), a plurality of temporary memories (temporary memories 34A, 35A, and 36A), and first priority controller 37A. ECU 30A is an ECU which does not relate to driving control of vehicle 1. Non-limiting examples of ECU 30A include an ECU which controls a body control function such as opening/closing of windows of vehicle 1, an ECU which controls output of display that is mounted on vehicle 1, etc.

Each of masters 31A, 32A, and 33A is a processing unit which executes processing for writing mutually different data into shared storage device 50. Specifically: master 31A executes processing for writing data (one example of first data) into shared storage device 50; master 32A executes processing for writing data (one example of second data) different from the data written by master 31A into shared storage device 50; and master 33A executes processing for writing data different from the data written by master 31A and the data written by master 32A into shared storage device 50. Examples of these data include an event log which relates to an event inside vehicle 1, a video and download information which relates to the event inside vehicle 1, etc. In other words, examples of processing which is performed by each of masters 31A, 32A, and 33A include recording of the event log, recording of the video and downloading (recording of the downloaded information). Masters 31A, 32A, and 33A are examples of first masters.

Temporary memories 34A, 35A, and 36A are memories for preventing loss of data of a master which has been waited for access.

Temporary memory 34A is a memory which is connected to master 31A, and is intended to prevent loss of data of master 31A which has been waited for access. Temporary memory 34A is capable of storing data from master 31A.

Temporary memory 35A is a memory which is connected to master 32A, and is intended to prevent loss of data of master 32A which has been waited for access. Temporary memory 35A is capable of storing data from master 32A.

Temporary memory 36A is a memory which is connected to master 33A, and is intended to prevent loss of data of master 33A which has been waited for access. Temporary memory 36A is capable of storing data from master 33A.

Each of temporary memories 34A, 35A, and 36A is implemented by, for example, a non-volatile semiconductor memory, or the like.

In this way, ECU 30A has a configuration in which each of temporary memories 34A, 35A, and 36A is connected to a corresponding one of masters 31A, 32A, and 33A. In this way, according to data storage system 1a, if the timing at which a write access collision will occur between masters 31A, 32A, and 33A inside ECU 30A is not known, it is possible to prevent data loss by saving data of a master which has been waited for write access into the temporary memory for the master, and reading the saved data from the temporary memory and writing it into shared storage device 50 when the write access collision is solved. In addition, in the present embodiment, since the plurality of ECUs 30 are connected to shared storage device 50 that is only one, a write access collision is particularly likely to occur between ECUs 30. According to data storage system 1a, at least one temporary memory is connected to each of the plurality of masters 31A, 32A, and 33A. Thus, even when a write access collision occurs between ECUs 30, it is possible to prevent loss of data of the master of the ECU which will be waited for write access.

It is to be noted that a write access collision is also referred to as a data collision hereinafter.

First priority controller 37A controls the order of priority in which data is written from masters 31A, 32A, and 33A to shared storage device 50. First priority controller 37A performs, for example, round robin control. For example, first priority controller 37A sequentially reads data from masters 31A, 32A, and 33A, and writes the data into shared storage device 50. In addition, when reading data from any of masters 31A, 32A, and 33A, in the case where the data is stored in the temporary memory for the master, first priority controller 37A reads the data from the temporary memory for the master, and writes the data into shared storage device 50. First priority controller 37A is one example of each of a dedicated priority controller and a first dedicated priority controller.

ECU 30B is an ECU which relates to safety (for example, an ECU which relates more to safety of vehicle 1 than ECU 30A), and includes a plurality of maters (masters 31B, 32B, and 33B), a plurality of temporary memories (temporary memories 34B, 35B, and 36B), and first priority controller 37B. ECU 30B is an ECU which relates to driving control of vehicle 1. Non-limiting examples of ECU 30B include an ECU which performs control for automatic driving, an ECU which controls acceleration (of an engine) and deceleration (of a break) of vehicle 1, and the like.

Each of masters 31B, 32B, and 33B is a processing unit which executes processing for writing mutually different data into shared storage device 50, similarly to each of masters 31A, 32A, and 33A of ECU 30A. Masters 31B, 32B, and 33B are examples of second masters.

Temporary memory 34B is a memory which is connected to master 31B, and is intended to prevent loss of data of master 31B which has been waited for access. Temporary memory 34B is capable of storing data (one example of third data) from master 31B. Temporary memory 34B is a duplex temporary memory in which, for example, two temporary memories store the same data.

Temporary memory 35B is a memory which is connected to master 32B, and is intended to prevent loss of data of master 32B which has been waited for access. Temporary memory 35B is capable of storing data (one example of fourth data) from master 32B. Temporary memory 35B is a duplex temporary memory in which, for example, two temporary memories store the same data.

Temporary memory 36B is a memory which is connected to master 33B, and is intended to prevent loss of data of master 33B which has been waited for access. Temporary memory 36B is capable of storing data from master 33B. Temporary memory 36B is a duplex temporary memory in which, for example, two temporary memories store the same data.

It is to be noted that each of temporary memories 34B, 35B, and 36B is not limited to be duplexed.

Each of temporary memories 34B, 35B, and 36A is implemented by, for example, a non-volatile semiconductor memory, or the like.

First priority controller 37B controls the order of priority in which data is written from masters 31B, 32B, and 33B to shared storage device 50. First priority controller 37B performs, for example, round robin control. For example, first priority controller 37B sequentially reads data from masters 31B, 32B, and 33B, and writes the data into shared storage device 50. In addition, when reading data from any of masters 31B, 32B, and 33B, in the case where the data is stored in the temporary memory for the master, first priority controller 37B reads the data from the temporary memory for the master, and writes the data into shared storage device 50. First priority controller 37B is one example of each of the dedicated priority controller and a second dedicated priority controller.

It is to be noted that vehicle 1 includes a plurality of ECUs 30A and a plurality of ECUs 30B.

As described above, data storage system 1a includes shared storage device 50, and thus each of ECUs 30A and 30B does not individually include a storage device for storing data that are processed by the respective masters. In this way, it is possible to reduce the number of storage devices in data storage system 1a, which enables cost reduction.

Embodiment 2

[2-1. Configuration of Data Storage System]

Figure 3:
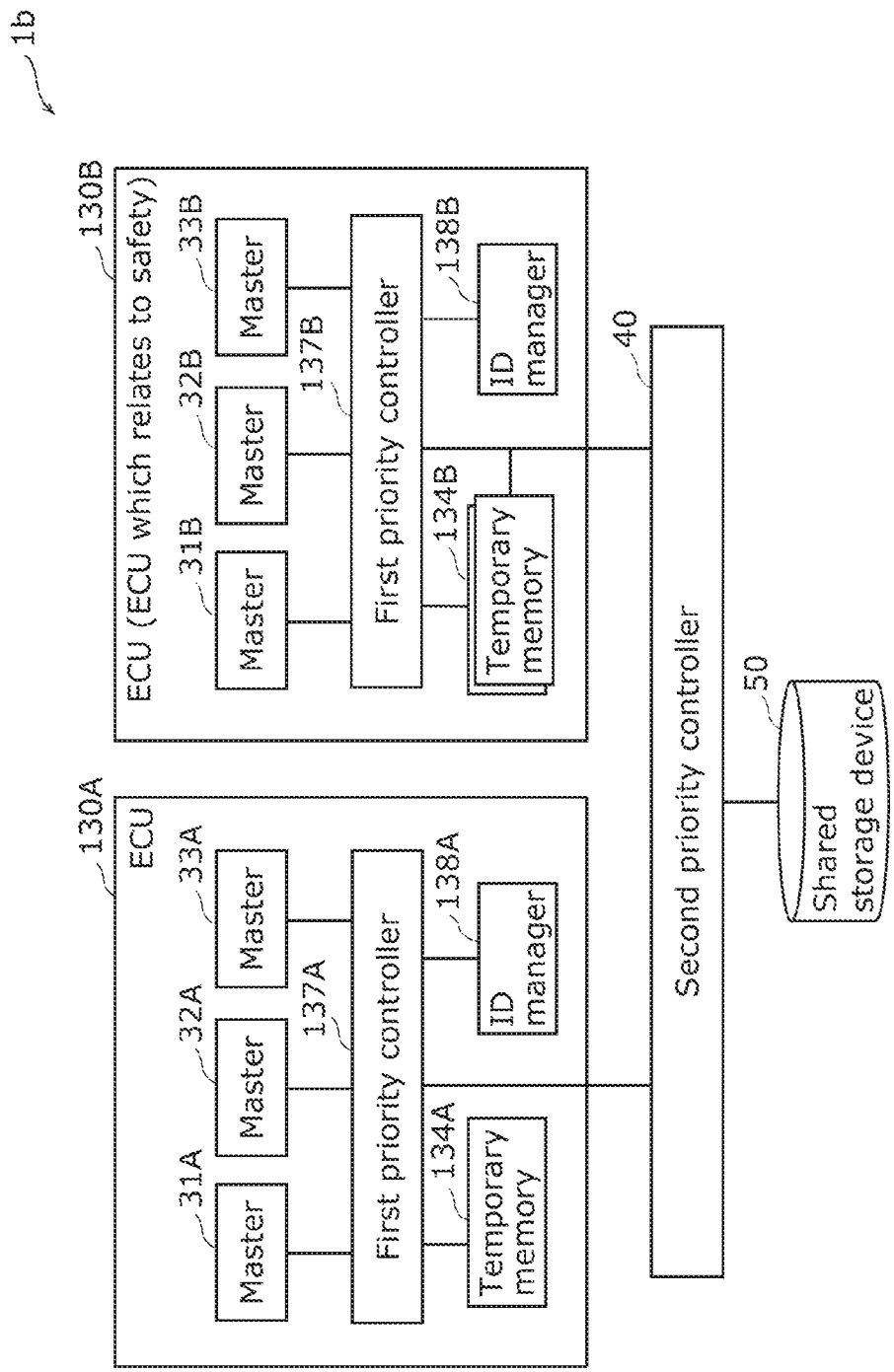
FIG. 3 is a block diagram illustrating a functional configuration of a data storage system according to Embodiment 2.

A configuration of a data storage system according to the present embodiment is described with reference to FIGS. 3 to 5. FIG. 3 is a block diagram illustrating a functional configuration of data storage system 1b according to the present embodiment.

As illustrated in FIG. 3, data storage system 1b includes ECUs 130A and 130B, second priority controller 40, and shared storage device 50.

ECU 130A is an ECU which does not relate to safety, and includes a plurality of masters (masters 31A, 32A, and 33A), temporary memory 134A, first priority controller 137A, and ID manager 138A.

Temporary memory 134A is a memory which is connected to first priority controller 137A, and is intended to prevent loss of data of the master which has been waited for access among masters 31A, 32A, and 33A. Temporary memory 134A is a memory shared by masters 31A, 32A, and 33A, and is capable of writing data of each of masters 31A, 32A, and 33A. Temporary memory 134A aggregates and stores data which have been output from masters 31A, 32A, and 33A inside ECU 130A and have not yet been written into shared storage device 50. Temporary memory 134A is one example of a first temporary memory.

First priority controller 137A is connected to a plurality of masters, and controls the order of priority in which data is written from the plurality of masters to shared storage device 50, based on an ID management table (one example of first priority information) which is managed by ID manager 138A. Specifically, data from two or more maters among the plurality of masters inside ECU 130A collide with each other, first priority controller 137A outputs the data from one master among the two or more masters into shared storage device 50 based on the ID management table, and assigns ID information (also referred to as ID) to data from the other master or each of the other masters, and stores the data with the ID into temporary memory 134A. For example, when data from two or more of the maters collide with each other, first priority controller 137A outputs the data having the higher or highest order of priority into shared storage device 50, and assigns information (for example, ID information) indicating the order of priority of data to the data having lower or lowest order of priority, and writes the data with the ID into temporary memory 134A.

In addition, based on ID information assigned to the data, first priority controller 137A sequentially outputs data temporarily stored into temporary memory 134A because of a data collision into shared storage device 50.

In this way, first priority controller 137A controls the order of priority in which data is written into shared storage device 50 by control based on the ID management table (ID control).

In addition, when data from two or more of the plurality of masters do not collide with each other, in other words, when first priority controller 137A obtains data from only one of the plurality of masters, first priority controller 137A outputs the data to second priority controller 40 without storing the data into temporary memory 134A.

It is to be noted that when outputting data to shared storage device 50, first priority controller 137A rewrites the data into a predetermined data format and then outputs the data. In the present embodiment, when outputting data to shared storage device 50, first priority controller 137A converts the data format of the data from the master into the Ethernet frame data format and then outputs the data to shared storage device 50.

ID manager 138A manages (stores), into shared storage device 50, the ID management table in which the type(s) of data and the order(s) of priority in which data is written are associated one-to-one with each other. The ID management table is described later with reference to FIG. 4. ID manager 138A is one example of a first manager.

ECU 130B is an ECU which relates to safety, and includes a plurality of maters (masters 31B, 32B, and 33B), temporary memory 134B, first priority controller 137B, and ID manager 138B.

Temporary memory 134B is a memory which is connected to first priority controller 137B, and is intended to prevent loss of data of the master which has been waited for access among masters 31B, 32B, and 33B. Temporary memory 134B is a memory shared by masters 31B, 32B, and 33B, and is capable of writing data of each of masters 31B, 32B, and 33B. Temporary memory 134B aggregates and stores data which have been output from masters 31B, 32B, and 33B inside ECU 130B and have not yet been written into shared storage device 50. Temporary memory 134B is a duplex temporary memory as a non-limiting example. Temporary memory 134B is one example of a second temporary memory.

First priority controller 137B is connected to a plurality of masters, and controls the order of priority in which data is written from each of the plurality of masters to shared storage device 50, based on an ID management table which is managed by ID manager 138B. Specifically, data from two or more maters among the plurality of masters inside ECU 130B collide with each other, first priority controller 137B outputs the data from one master among the two or more masters into shared storage device 50 based on the ID management table (one example of second priority information), and assigns ID information to the data from the other master or each of the other masters, and stores the data into temporary memory 134B. For example, when data from two or more of the plurality of maters collide with each other, first priority controller 137B outputs the data having the higher or highest order of priority into shared storage device 50, and assigns information (for example, ID information) indicating the order of priority of data to the data having the lower or lowest order of priority, and writes the data into temporary memory 134B.

In this way, it is possible to reliably write the data in write access having the high order of priority (high safety) into shared storage device 50, and to prevent data in write access having the low order of priority (low safety) from being lost. In addition, since the information indicating the order of priority is assigned to the data to be written into first temporary memory 134B, it is possible to identify the data (for example, determines from which master the data comes).

In addition, based on ID information assigned to the data, first priority controller 137B sequentially outputs the data temporarily stored into temporary memory 134B because of the data collision into shared storage device 50.

In this way, first priority controller 137B controls the order of priority in which data is written into shared storage device 50 by control based on the ID management table (ID control).

In addition, when data from two or more of the plurality of masters do not collide with each other, in other words, when first priority controller 137B obtains data from only one of the plurality of masters, first priority controller 137B outputs the data to second priority controller 40 without storing the data into temporary memory 134B.

It is to be noted that when outputting the data to shared storage device 50, first priority controller 137B rewrites the data into a predetermined data format and then outputs the data. In the present embodiment, when outputting the data to shared storage device 50, first priority controller 137B converts the data format of the data from the master into the Ethernet frame data format and then outputs the data to shared storage device 50.

ID manager 138B manages (stores) the ID management table in which the type(s) of data and the order(s) of priority in which data is written into shared storage device 50 are associated one-to-one with each other.

Here, the ID management table managed by each of ID managers 138A and 138B is described with reference to FIG. 4. FIG. 4 is a diagram indicating the ID management table according to the present embodiment. It is to be noted that the ID management table is one example of the first priority information.

As illustrated in FIG. 4, the ID management table is a table in which access classification, processing classification, processing details, and the order of priority are associated with each other on a per-access basis.

Access classification indicates the classification of write processing performed on a per-data basis. Classifications include automotive safety integrity level (ASIL) write, non-ASIL write, and communication write. ASIL write indicates access which relates to safety (data writing which relates to safety), non-ASIL write indicates access which does not relate to safety (data writing which does not relate to safety), and communication write indicates download access (writing of downloaded data) from a server outside vehicle 1.

Processing classification indicates the processing classification of data for each access classification. Processing classifications include event log recording, event image recording, anytime log recording, anytime image recording, and download.

The access classification of each of event log recording and the event image recording is included in ASIL write. The event log recording means recording a log regarding an event which relates to safety of vehicle 1 into shared storage device 50. For example, the event log recording includes recording of logs before and after occurrence of detection of a risk by obstacle detection as illustrated in the example of processing details. Event image recording means recording a video regarding an event which relates to safety of vehicle 1. For example, the event image recording includes recording of videos or detection analysis images before and after occurrence of detection of a risk by obstacle detection as illustrated in the example of processing details.

The access classification of each of anytime log recording and anytime image recording is included in non-ASIL write. Anytime log recording means keeping recording of a log which does not relate to safety. Examples of such logs include a driving log (such as position information), own-vehicle information (such as the state of the vehicle), and a passenger state (such as a blood pressure). Anytime image recording means keeping recording of a video which does not relate to safety. Examples of anytime image recording include recording of a driving video.

Download is included in communication write. Download means downloading information from a server outside vehicle 1. For example, software update using over the air (OTA), or the like is included in download, and management data from the server is included in such information.

The order of priority indicates the order of priority in which data is written into shared storage device 50 for each access classification. The order of priority is according to the degree of priority for the safety of vehicle 1. The order of priority indicates, for example, that data in ASIL write is preferentially written into shared storage device 50 when the data in ASIL writhe and data in non-ASIL write collide with each other.

Here, ID information indicated in each of the processing detail examples is described. In the sign "IDm-n", "m" denotes the order of priority based on safety with respect to access classification. For this reason, "m" may be the same numerical value if access classifications are the same regardless of the processing classifications. In addition, "n" denotes the order of priority by safety with respect to processing details. For this reason, "n" may be different numerical values when processing details are different even if access classifications are the same. Such ID information indicates that the order of priority by safety is higher when the numerical value of "m" is smaller and/or the numerical value of "n" is smaller.

For example, in FIG. 4, the degree of priority of ASIL write by safety in access classification is set to be highest, and the degree of priority of log recording by safety in processing is set to be higher than image recording. This makes it possible to reliably record an event log which is detailed data recorded at the time when an accident has occurred into shared storage device 50.

The ID information of the processing details "recording of logs before and after occurrence of detection of risk by obstacle detection" is "ID1-1", and the ID information of the processing details "recording of videos or detection analysis images before and after occurrence of detection of risk by obstacle detection" is "ID1-2". In addition, the ID information of the processing details "driving log (position information, etc.)" is "ID2-1", the ID information of the processing details "own vehicle information (vehicle state, etc.)" is "ID2-2", the ID information of the processing details "passenger state (blood pressure, etc.)" is "ID2-3", and the ID information of the processing details "recording of driving video" is "ID2-4". In addition, the ID information of the processing details "update of software" is "ID3-1", the ID information of the processing details "management data from server" is "ID3-2".

For example, in "ASIL write" in access classification, "recording of logs (recording of logs before and after occurrence of detection of risk by obstacle detection)" is most prioritized; in "non-ASIL write" in access classification, "driving log (position information, etc.)" is most prioritized; and in "communication write" in access classification, "update of software" is most prioritized.

It is to be noted that IDs indicated in FIG. 4 are examples. Numerical values of "m" and "n" may be appropriately determined by a manufacturing company of vehicle 1 so that desired data can be reliably recorded in shared storage device 50.

It is to be noted that each of ID managers 138A and 138B does not always need to store the whole information in the ID management table indicated in FIG. 4. ID manager 138A may store, for example, only information required for determination in ECU 130A, and ID manager 138B may store, for example, only information required for determination in ECU 130B.

Alternatively, ID manager 138A may manage a list of data (a data management table) recorded in temporary memory 134A, and ID manager 138B may manage a list of data (a data management table) recorded in temporary memory 134B. An example of a data management table managed by each of ID managers 138A and 138B is described with reference to FIG. 5. FIG. 5 is a diagram indicating a data management table according to the present embodiment.

As indicated in FIG. 5, the data management table includes, as items, access classification, processing classification, examples of processing details, the number of stored data, addresses in the temporary memory.

The number of stored data indicates the number of data indicated by the processing details. In an exemplary case of event log recording, the number of stored data indicates that two data have been recorded. Each of the addresses in the temporary memory indicates the address at which data is recorded in the temporary memory. Each of the start addresses indicates the address at which recording of data starts, and the number of contiguous addresses indicates the number of data. For example, in the case of event log recording, data (a log) whose start address is "0x0000_0000" and the number of data is 8 and data (a log) whose start address is "0x0000_0010" and the number of data is 8 have been recorded in the temporary memory in this listed sequence.

As a non-limiting example, a data management table in which data are recorded for each access classification in order of recording time points of the data is prepared.

The data management table indicated in FIG. 5 is used when first priority controllers 137A and 137B output the data recorded in the temporary memory into shared storage device 50. First priority controller 137A sequentially outputs data recorded in temporary memory 134A into shared storage device 50 based on the data management table. In addition, first priority controller 137B sequentially outputs data recorded in temporary memory 134B into shared storage device 50 based on the data management table. For example, each of first priority controllers 137A and 137B may sequentially output data into shared storage device 50 in order of recording time points of the data at which the data has been recorded in the temporary memory.

It is to be noted that each of ID managers 138A and 138B does not always need to store the whole information in the data management table indicated in FIG. 5. Alternatively, ID manager 138A may record, for example, only information which relates to data recorded in temporary memory 134A, and ID manager 138B may record, for example, only information which relates to data recorded in temporary memory 134B.

[2-2. Operation Performed by Data Storage System]

Figure 6A:
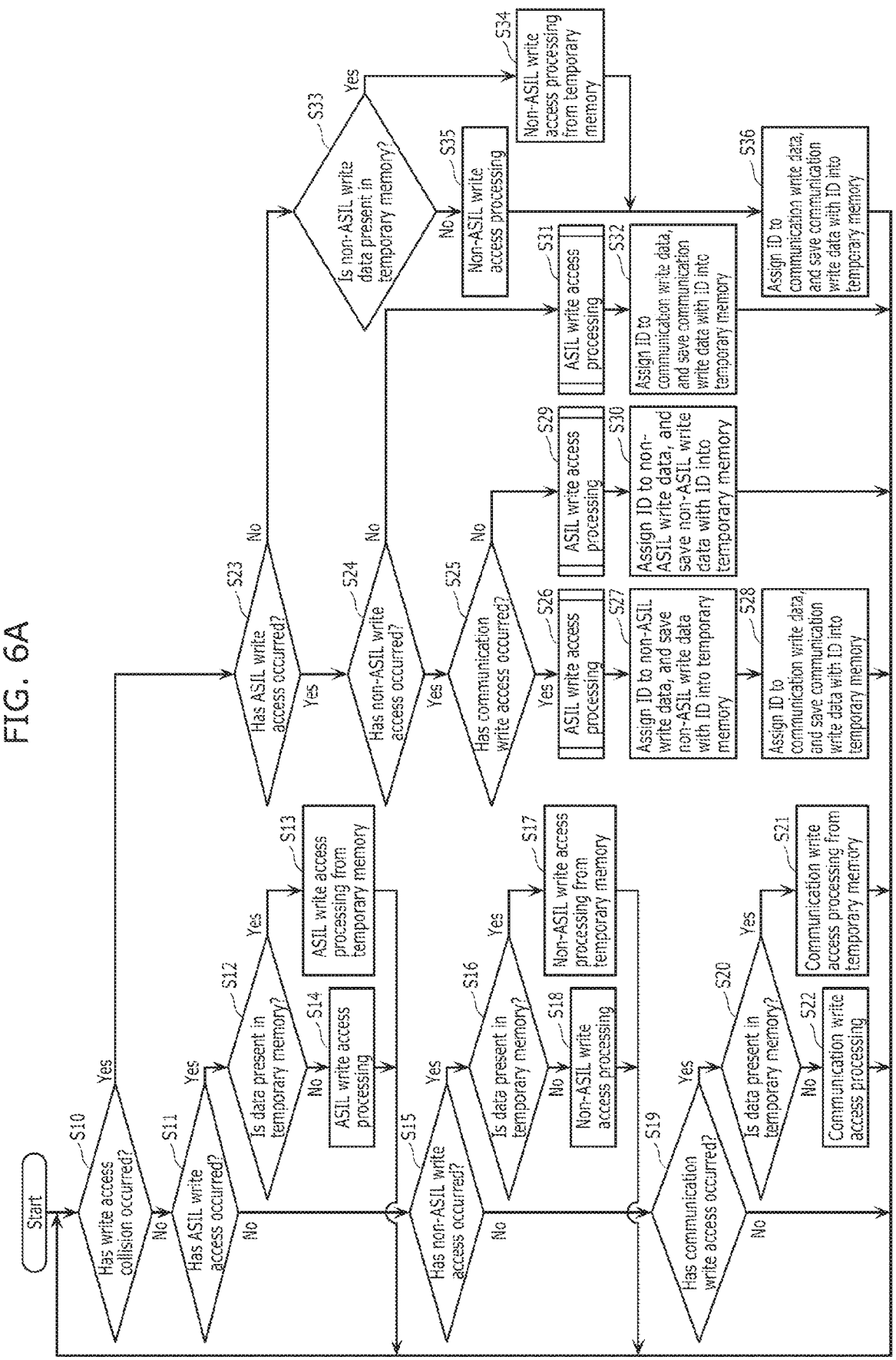
FIG. 6A is a flow chart indicating an operation that is performed by the data storage system according to Embodiment 2.
Figure 6B:
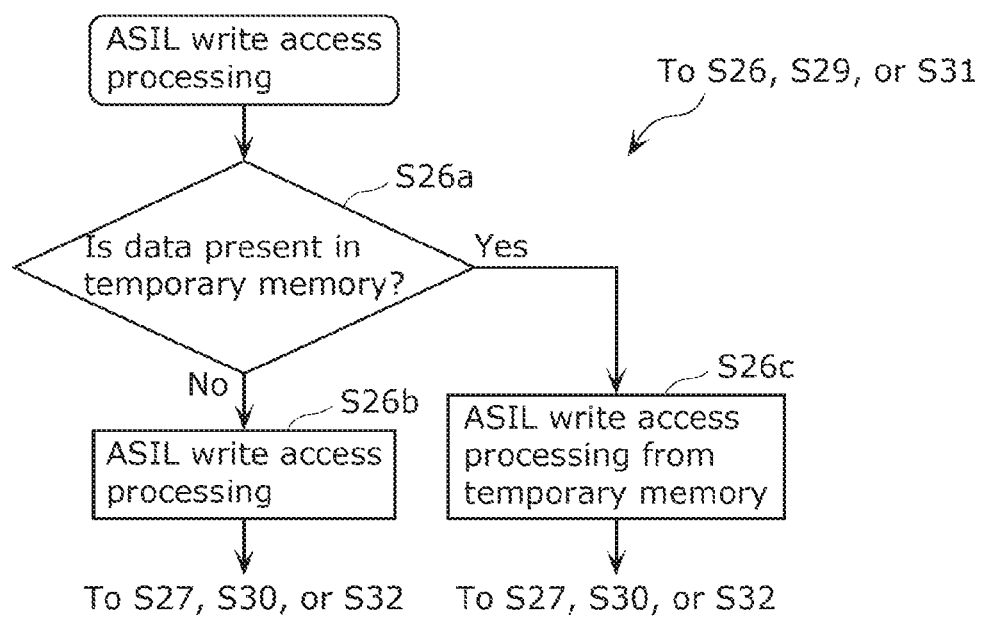
FIG. 6B is a flow chart indicating details of Steps S26, S29, and S31 indicated in FIG. 6A.

An operation that is performed by data storage system 1b configured as described above is described with reference to FIGS. 6A and 6B. FIG. 6A is a flow chart indicating an operation that is performed by data storage system 1b according to the present embodiment. FIG. 6B is a flow chart indicating details of Steps S26, S29, and S31 indicated in FIG. 6A. Hereinafter, an operation that is performed by ECU 130B is described. In addition, descriptions are given of examples in each of which ECU 130B performs access in a corresponding one of ASIL write, non-ASIL write, and communication write.

As indicated in FIG. 6A, first priority controller 137B determines whether a write access collision has occurred when write access has occurred (S10). Any known method may be used to determine whether a write access collision has occurred.

Next, when determining that no write access collision has occurred (No in S10), first priority controller 137B determines whether an ASIL write access has occurred, that is, whether the access from a master is an ASIL write access (S11). First priority controller 137B may determine from which master the data has obtained, or determine whether the access is ASIL write access through analysis of the obtained data.

Next, when determining that ASIL write access has occurred (Yes in S11), first priority controller 137B determines whether ASIL write data or data having the same processing details has been recorded in temporary memory 134B (S12). When determining that such data has been recorded in temporary memory 134B (Yes in S12), first priority controller 137B performs ASIL write access processing from temporary memory 134B (S13). More specifically, first priority controller 137B performs processing of writing, into shared storage device 50, ASIL write data which undergone a collision in the past and has been recorded (saved) in temporary memory 134B by prioritizing the ASIL write data over the ASIL write data which has been currently obtained. In this case, first priority controller 137B records the currently obtained ASIL write data into temporary memory 134B. First priority controller 137B may then update the data management table.

When determining that no such data has been recorded in temporary memory 134B (No in S12), first priority controller 137B performs ASIL write access processing onto the currently obtained ASIL write data (S14). In other words, first priority controller 137B performs processing of writing the currently obtained ASIL write data into shared storage device 50 without recording the currently obtained ASIL write data into temporary memory 134B.

On the other hand, when determining that no ASIL write access has occurred (No in S11), first priority controller 137B determines whether non-ASIL write access has occurred, that is, the access from the master is non-ASIL write access (S15). First priority controller 137B may determine from which master the data has been obtained, or determine whether the access is non-ASIL write access through analysis of the obtained data.

Next, when determining that ASIL write access has occurred (Yes in S15), first priority controller 137B determines whether non-ASIL write data or data having the same processing details has been recorded in temporary memory 134B (S16). When determining that such data has been recorded in temporary memory 134B (Yes in S16), first priority controller 137B performs non-ASIL write access processing from temporary memory 134B (S17). More specifically, first priority controller 137B performs processing of writing, into shared storage device 50, non-ASIL write data which undergone a collision in the past and has been recorded (saved) in temporary memory 134B by prioritizing the non-ASIL write data over the non-ASIL write data which has been currently obtained. In this case, first priority controller 137B records the currently obtained non-ASIL write data into temporary memory 134B. First priority controller 137B may then update the data management table.

When determining that no such data has been recorded in temporary memory 134B (No in S16), first priority controller 137B performs non-ASIL write access processing onto the currently obtained non-ASIL write data (S18). In other words, first priority controller 137B performs processing of writing the currently obtained non-ASIL write data into shared storage device 50 without recording the currently obtained non-ASIL write data into temporary memory 134B.

On the other hand, when determining that no non-ASIL write access has occurred (No in S15), first priority controller 137B determines whether communication write access has occurred, that is, the access from the master is communication write access (S19). First priority controller 137B may determine from which master the data has been obtained, or determine whether the access is communication write access through analysis of the obtained data.

Next, when determining that communication write access has occurred (Yes in S19), first priority controller 137B determines whether communication write data or data having the same processing details has been recorded in temporary memory 134B (S20). When determining that such data has been recorded in temporary memory 134B (Yes in S20), first priority controller 137B performs communication write access processing from temporary memory 134B (S21). More specifically, first priority controller 137B performs processing of writing, into shared storage device 50, communication write data which undergone a collision in the past and has been recorded in temporary memory 134B by prioritizing the communication write data over the communication write data which has been currently obtained. In this case, first priority controller 137B records the currently obtained communication write data into temporary memory 134B. First priority controller 137B may then update the data management table.

When determining that no such data has been recorded in temporary memory 134B (No in S20), first priority controller 137B performs communication write access processing onto the currently obtained communication write data (S22). In other words, first priority controller 137B performs processing of writing the currently obtained communication write data into shared storage device 50 without recording the currently obtained communication write data into temporary memory 134B.

When determining that no communication write access has occurred (No in S19), first priority controller 137B returns to Step S10.

On the other hand, when determining that a write access collision has occurred (Yes in S10), first priority controller 137B determines whether ASIL write access has occurred, that is, whether the access from a master is ASIL write access (S23). First priority controller 137B determines whether access from a mater and access from another master which collide includes ASIL write access.

Next, when determining that ASIL write access has occurred (Yes in S23), first priority controller 137B determines whether non-ASIL write access has occurred, that is, the access from a master and access from the another master includes non-ASIL write access (S24).

Next, when determining that non-ASIL write access has occurred (Yes in S24), first priority controller 137B determines whether communication write access has occurred, that is, the access from the master and the access from the another master includes communication write access (S25).

Next, when determining that communication write access has occurred (Yes in S25), first priority controller 137B performs processing of ASIL write access among the access from the mater and the access from the another master which have collided (S26). Since the ASIL write access, the non-ASIL write access, and the communication write access have collided when the determination result in Step S25 is Yes, first priority controller 137B performs processing of writing the ASIL write data into shared storage device 50 without recording the ASIL write data into temporary memory 134B.

As indicated in FIG. 6B, when determining that ASIL write access has occurred (Yes in S23), first priority controller 137B determines whether ASIL write data or data having the same processing details has been recorded in temporary memory 134B (S26a), based on the data management table. When determining that such data has been recorded in temporary memory 134B (Yes in S26a), first priority controller 137B performs ASIL write access processing from temporary memory 134B (S26c). More specifically, first priority controller 137B performs processing of writing, into shared storage device 50, ASIL write data which undergone a collision in the past and has been recorded (saved) in temporary memory 134B by prioritizing the ASIL write data over the ASIL write data which has been currently obtained. In this case, first priority controller 137B records the currently obtained ASIL write data into temporary memory 134B. First priority controller 137B may then update the data management table.

When determining that no such data has been recorded in temporary memory 134B (No in S26), first priority controller 137B performs ASIL write access processing onto the currently obtained ASIL write data (S26b). In other words, first priority controller 137B performs processing of writing the currently obtained ASIL write data into shared storage device 50 without recording the currently obtained ASIL write data into temporary memory 134B.

With reference to FIG. 6A again, first priority controller 137B next assigns an ID to the non-ASIL write data, and saves the non-ASIL write data with the ID into temporary memory 134B (S27), and assigns an ID to the communication write data, and saves the communication write data with the ID into temporary memory 134B (S28). First priority controller 137B may then update the data management table.

In this way, when the ASIL write access, the non-ASIL write access, and the communication write access have collided, first priority controller 137B is capable of reliably writing the ASIL write access data having a high safety level into shared storage device 50, and preventing the non-ASIL write access data and communication write access data from being lost. It is to be noted that saving data means temporarily recording the data into temporary memory 134B in order to prevent the data from being lost.

Next, when determining that no communication write access has occurred (No in S25), first priority controller 137B performs processing of ASIL write access among the access from the mater and the access from the another master which have collided (S29). Since the ASIL write access and the non-ASIL write access have collided when the determination result in Step S25 is No, first priority controller 137B performs processing of writing the ASIL write data into shared storage device 50 without recording the ASIL write data into temporary memory 134B. It is to be noted that the processing in Step S29 is similar to the processing in Step S26 as indicated in FIG. 6B, and thus an overlapping description is not repeated.

Next, first priority controller 137B assigns an ID to the non-ASIL write data, and saves the non-ASIL write data with the ID into temporary memory 134B (S30). First priority controller 137B may then update the data management table.

In this way, when the ASIL write access and the non-ASIL write access have collided, first priority controller 137B is capable of reliably writing the ASIL write access data having a high safety level into shared storage device 50, and preventing the non-ASIL write access data from being lost.

Next, when determining that no non-ASIL write access has occurred (No in S24), first priority controller 137B performs processing of ASIL write access among the access from the mater and the access from the another master (S31). Since the ASIL write access and the communication write access have collided when the determination result in Step S24 is No, first priority controller 137B performs processing of writing the ASIL write data into shared storage device 50 without recording the ASIL write data into temporary memory 134B. It is to be noted that the processing in Step S31 is similar to the processing in Step S26 as indicated in FIG. 6B, and thus an overlapping description is not repeated.

Next, first priority controller 137B assigns an ID to the communication write data, and saves the communication write data with the ID into temporary memory 134B (S32). First priority controller 137B may then update the data management table.

In this way, when the ASIL write access and the communication write access have collided, first priority controller 137B is capable of reliably writing the ASIL write access data having a high safety level into shared storage device 50, and preventing the communication write access data from being lost.

On the other hand, when determining that no ASIL write access has occurred (No in S23), first priority controller 137B determines whether non-ASIL write data has been recorded in temporary memory 134B (S33). The determination in Step S33 may be made, for example, based on the data management table indicated in FIG. 5. It is to be noted that examples in the cases where the determination result in Step S23 is No include a case of a collision between non-ASIL write access and communication write access, a case of a collision between non-ASIL write access and other non-ASIL write access, and a case of a collision between communication write access and other communication write access. Hereinafter, a case of a collision between non-ASIL write access and communication write access is described.

When determining that non-ASIL write data has been recorded in temporary memory 134B (Yes in S33), first priority controller 137B performs non-ASIL write access processing from temporary memory 134B (S34). More specifically, first priority controller 137B performs processing of writing, into shared storage device 50, non-ASIL write data which undergone a collision in the past and has been recorded (saved) in temporary memory 134B by prioritizing the non-ASIL write data over the non-ASIL write data which has been currently obtained. In this case, first priority controller 137B records the currently obtained non-ASIL write data into temporary memory 134B. On the other hand, when determining that no non-ASIL write data has been recorded in temporary memory 134B, first priority controller 137B performs non-ASIL write access processing onto the non-ASIL write data among the non-ASIL write access and the communication write access which have collided. In other words, first priority controller 137B performs processing of writing the currently obtained non-ASIL write data into shared storage device 50 without recording the currently obtained non-ASIL write data into temporary memory 134B.

Next, first priority controller 137B assigns an ID to the communication write data, and saves the communication write data with the ID into temporary memory 134B (S36). First priority controller 137B may then update the data management table.

In this way, when the non-ASIL write access and the communication write access have collided, first priority controller 137B is capable of reliably writing the ASIL write access data having a high safety level into shared storage device 50, and preventing the communication write access data from being lost.

Variation of Embodiment 2

In the present variation, a description is given of a case in which the temporary memory is divided into memory regions for respective IDs, and data is written for each ID into a memory region according to the ID of the data. FIG. 7 is a diagram illustrating an example of region division in a temporary memory according to the present variation. FIG. 7 indicates an ID management table that is managed by an ID manager according to the present variation. It is to be noted that the functional configuration of a data storage system according to the present variation may be the same as data storage system 1b according to Embodiment 2. Hereinafter, descriptions are given using the numerical signs used for data storage system 1b.

As illustrated in FIG. 7, the ID management table is a table in which access classification, processing classification, processing details, and the order of priority are associated with each other on a per-access basis. It is to be noted that the ID management table indicated in FIG. 7 may be the ID management table corresponding to at least one of temporary memories 134A and 1348. Hereinafter, a description is given of a case in which the ID management table indicated in FIG. 7 is the ID management table corresponding to temporary memory 1348, that is, the ID management table that is managed by ID manager 1388.

The addresses in temporary memory 1348 includes start addresses and end addresses of data, and a start address and an end address are associated with each other on a per-different-ID-data basis. For example, the data (event log) with ID1-1 is stored in the memory region that starts with the address "0x0010_0000" and ends with the address "0x001F_FFFF". In other words, temporary memory 1348 has been divided into memory regions for respective data in advance.

In this case, when a collision occurs when two or more of the plurality of masters in ECU 130B access shared storage device 50 to write the data, first priority controller 1378 writes the data having the lower order of priority into the memory region corresponding to the data in temporary memory 1348, based on the ID management table indicated in FIG. 7.

In this way, first priority controller 1378 does not always need to assign an ID to data to be stored in temporary memory 1348, it is possible to reduce the capacity required for temporary memory 1348. The reduction in the capacity of temporary memory 1348 leads to reduction in cost for data storage system 1b.

In addition, also in ECU 130A, temporary memory 134A has been divided into memory regions for respective data in advance. When a collision occurs when two or more of the plurality of masters in ECU 130A access shared storage device 50 to write the data, first priority controller 137A writes the data having the lower or lowest order of priority into the memory region corresponding to the data in temporary memory 134A, based on the ID management table (one example of the second priority information) that is managed by ID manager 138A.

Embodiment 3

[3-1. Configuration of Data Storage System]

A configuration of a data storage system according to the present embodiment is described with reference to FIGS. 8 to 10. FIG. 8 is a block diagram illustrating a functional configuration of data storage system 1c according to the present embodiment.

As illustrated in FIG. 8, data storage system 1c includes ECUs 130A and 230B, second priority controller 240, and shared storage device 50. Data storage system 1c includes ECU 230B and second priority controller 240 instead of ECU 130B and second priority controller 40, respectively, of data storage system 1b indicated in Embodiment 2.

ECU 230B is an ECU which relates to safety, and includes a plurality of masters (masters 31B, 32B, and 33B) and first priority controller 237B. ECU 230B does not include any temporary memory and any ID manager.

First priority controller 237B is connected between the plurality of masters and second priority controller 240. When a collision occurs when two or more of the plurality of masters in ECU 230B access shared storage device 50 to write the data, first priority controller 237B controls the order of priority on a per-access basis by most prioritizing safety.

The control by most prioritizing safety in ECU 230B is performed based on quality of service (QoS) control values which have been set by most prioritizing safety to the respective masters. These setting values are stored in the header part of the interface for second priority controller 240 and is to be output.

When a collision occurs when the two or more of the plurality of masters in ECU 230B access shared storage device 50 to write the data, first priority controller 237B writes the data having the higher or highest safety level into shared storage device 50. Most prioritizing safety means prioritizing a master which relates to safety over any other master (for example, the master which does not relate to safety), so as not to cause the master which relates to safety to be waited for access. For example, most prioritizing safety means most prioritizing access from the master which relates to safety.

When a collision occurs when two or more of the plurality of masters in ECU 130A and ECU 230B access shared storage device 50 to write the data, second priority controller 240 controls the order of priority on a per-access basis by most prioritizing safety. In other words, when a collision occurs when the two or more of the plurality of masters in ECU 130A and ECU 230B access shared storage device 50 to write the data, second priority controller 240 preferentially writes the data from ECU 230B into shared storage device 50.

Here, in the present embodiment, an ID management table and a data management table which are managed by ID manager 138A are described with reference to FIGS. 9 and 10. FIG. 9 is a diagram indicating the ID management table according to the present embodiment.

As indicated in FIG. 9, no ID is set for processing details associated with any processing classification which relates to ASIL write as access classification. In addition, the order of priority has been set for each processing details not for each access classification. For example, in the case of using the ID management table indicated in FIG. 9, when access for event log recording and access for event image recording collide with each other, the access for event log recording having the higher order of priority is prioritized.

Even in this case, it is possible to design the system so as not to prevent the data of the event image recording from being lost because the access for event log recording requires a small amount of data, and the access for event image recording has the higher order of priority than any processing in non-ASIL write and communication write.

FIG. 10 is a diagram indicating the data management table according to the present embodiment.

As indicated in FIG. 10, since first priority controller 2378 performs control by most prioritizing safety, no data having access classification of ASIL write is included in the data management table. In other words, such data is not stored in any temporary memory.

[3-2. Operation Performed by Data Storage System]

Figure 11:
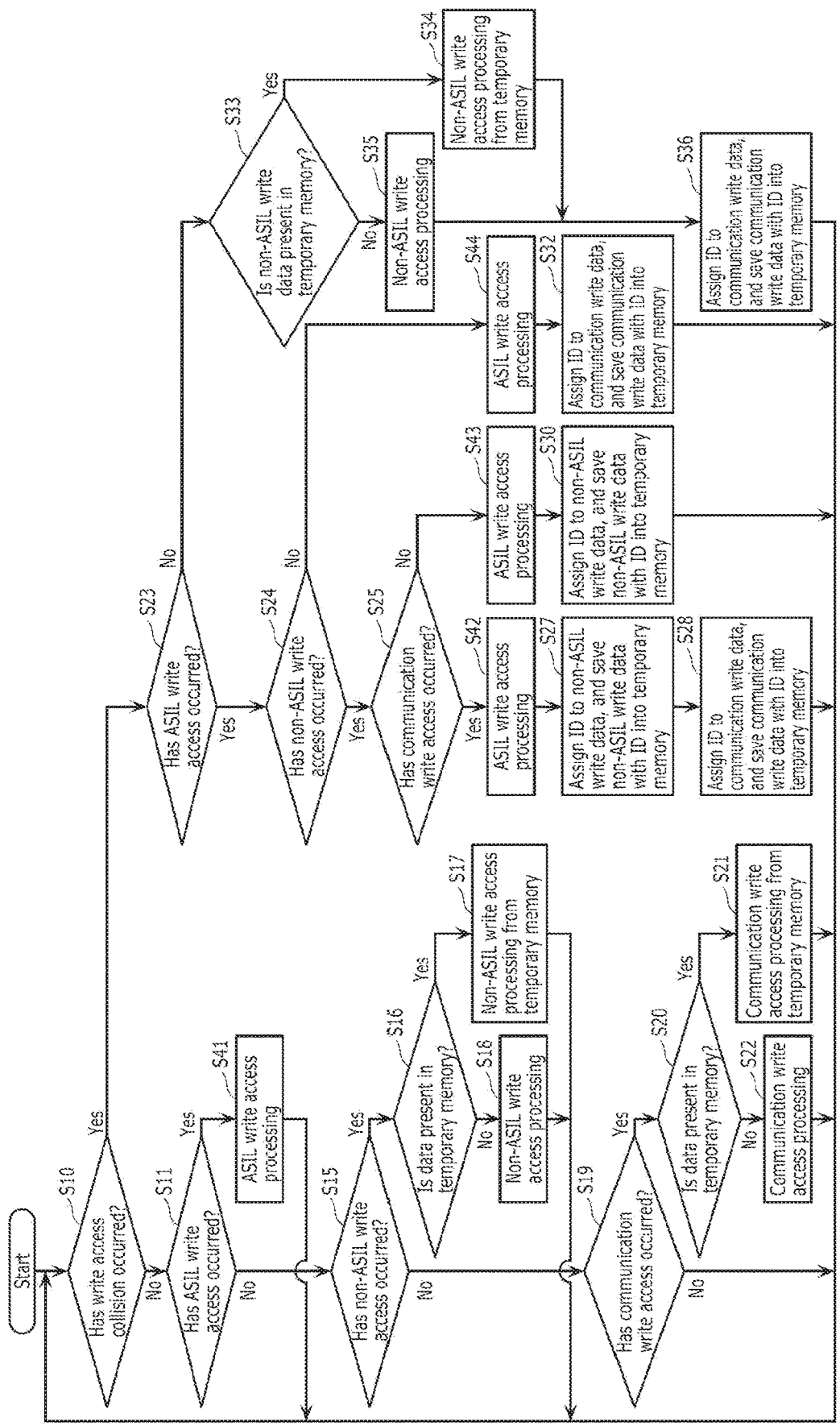
FIG. 11 is a flow chart indicating an operation that is performed by the data storage system according to Embodiment 3.

An operation that is performed by data storage system 1c configured as described above is described with reference to FIG. 11. FIG. 11 is a flow chart indicating an operation that is performed by data storage system 1c according to the present embodiment. Hereinafter, an operation that is performed by ECU 230B is described. In addition, descriptions are given of examples in each of which ECU 230B performs access in a corresponding one of ASIL write, non-ASIL write, and communication write. In addition, hereinafter, differences from the steps in FIG. 6A indicated in Embodiment 2 are mainly described, and the same steps as or steps similar to the steps indicated in FIG. 6A are assigned the same numerical signs and overlapping descriptions thereof are omitted or simplified.

As indicated in FIG. 11, when no write access collision has occurred and ASIL write access has occurred (No in S10 and Yes in S11), first priority controller 2378 performs ASIL write access processing onto the data of ASIL write which has been currently obtained (S41). In other words, first priority controller 2378 performs processing of writing the data of ASIL write which has been currently obtained into shared storage device 50.

In addition, when ASIL write access has occurred when a write access collision has occurred (Yes in S10 and Yes in S23), first priority controller 2378 performs ASIL write access processing onto the data of ASIL write which has been currently obtained (S42, S43, and S44). In other words, first priority controller 237B performs processing of writing the data of ASIL write which has been currently obtained into shared storage device 50.

Variation 1 of Embodiment 3

Figure 12:
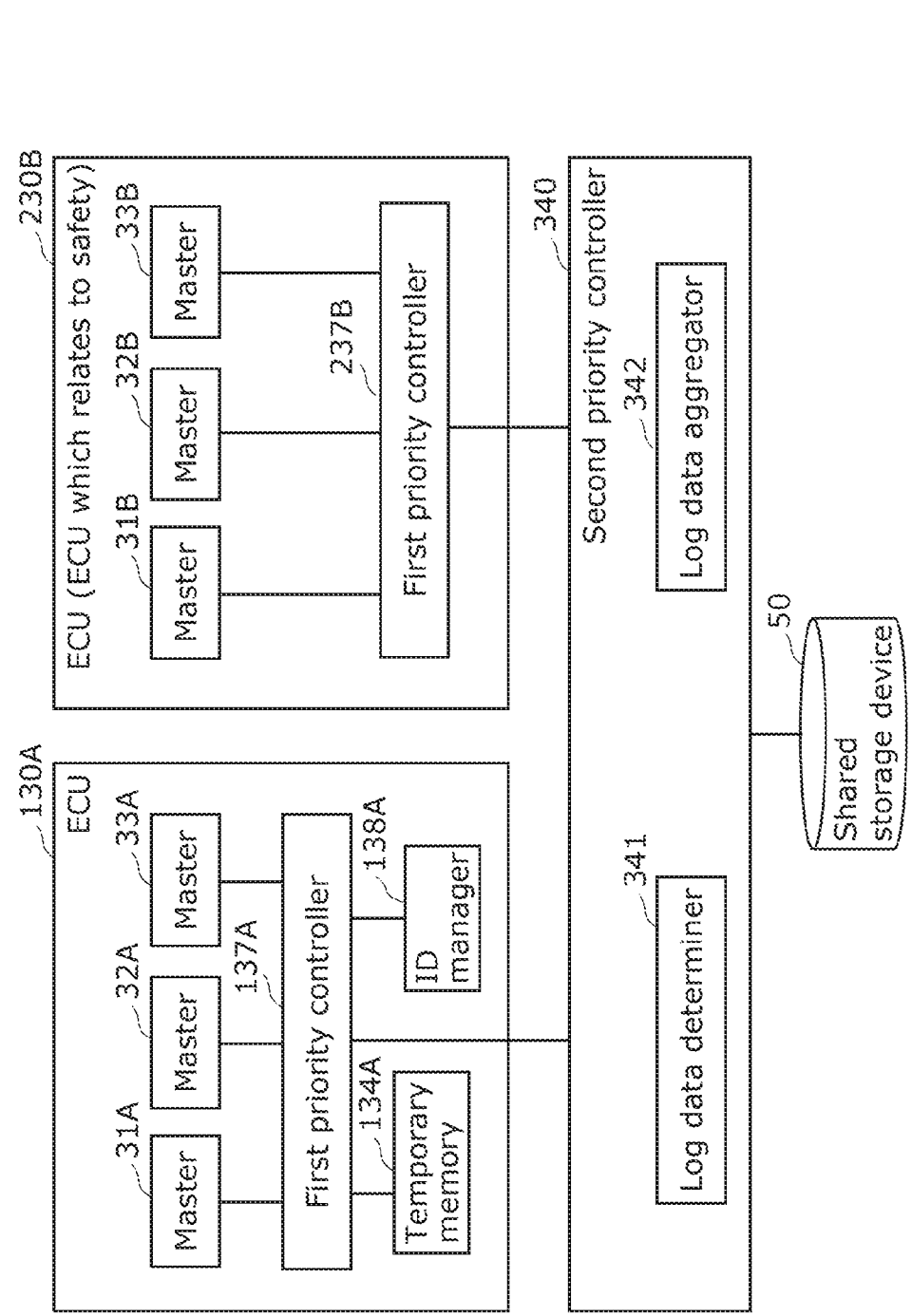
FIG. 12 is a block diagram illustrating a functional configuration of a data storage system according to Variation 1 of Embodiment 3.

The present variation describes an example in which second priority controller aggregates log data each having a small amount of data and collectively writes the respective data into shared storage device. FIG. 12 is a block diagram illustrating a functional configuration of data storage system 1d according to the present variation.

As illustrated in FIG. 12, data storage system 1d according to the present variation includes second priority controller 340 instead of second priority controller 240 in data storage system 1c according to Embodiment 3.

Second priority controller 340 includes log data determiner 341 and log data aggregator 342.

Log data determiner 341 determines whether each of the data obtained respectively from ECUs 130A and 230B (examples of the plurality of ECUs) is log data. Log data determiner 341 makes the determination, based on the register values for QoS control included in the data from ECUs 130A and 230B. However, log data determiner 341 may make the determination by parsing the data obtained. Log data determiner 341 is one example of a determiner.

When Ethernet is used as the interface between the plurality of ECUs 30 and shared storage device 50, information indicating the degree of priority of the data is included in either Priority Code Point (PCP), IP Precedence, or Differentiated Services Code Point (DSCP) of a virtual LAN (VLAN) included in the header part of an Ethernet frame. For example, when converting the data from master 31B, or the like into an Ethernet frame, first priority controller 237B includes information indicating the degree of priority of the data (for example, information according to the ID of the data) into either PCT, IP Precedence, or DSCP of the VLAN. Alternatively, when a PCIe interface is used as the interface between the plurality of ECUs 30 and shared storage device 50, information indicating the degree of priority of the data is included in a Virtual Channel (VC).

Log data aggregator 342 aggregates data each of which log data determiner 341 has determined to be log data, and performs processing for collectively writing the aggregated data into shared storage device 50. For example, log data aggregator 342 aggregates, in packing, a certain number of log data, and collectively writes the log data into shared storage device 50. Packing here means aggregating the plurality of log data into a single pack of data that are to be written into shared storage device 50 in one writing operation.

Log data aggregator 342 aggregates log data so that the amount of log data aggregated is at or above a first threshold value and at or below a second threshold value higher than the first threshold value. The first threshold value is at or above the amount corresponding to the total of the amounts of two log data, and the second threshold value is a value corresponding to the capacity of one page in shared storage device 50.

Log data aggregator 342 may aggregate individually or collectively log data of ECUs which do not relate to safety including ECU 130A and log data of ECUs which relate to safety including ECU 230B.

In this way, log data aggregator 342 is capable of reducing the number of times of writing data into shared storage device 50, and extending the lifetime of shared storage device 50. Log data aggregator 342 is capable of reducing the number of times of exchanging shared storage devices 50 for a moving body such as vehicle 1 having a long lifecycle, and thus is capable of reducing the cost required for the moving body.

Variation 2 of Embodiment 3

Figure 13:
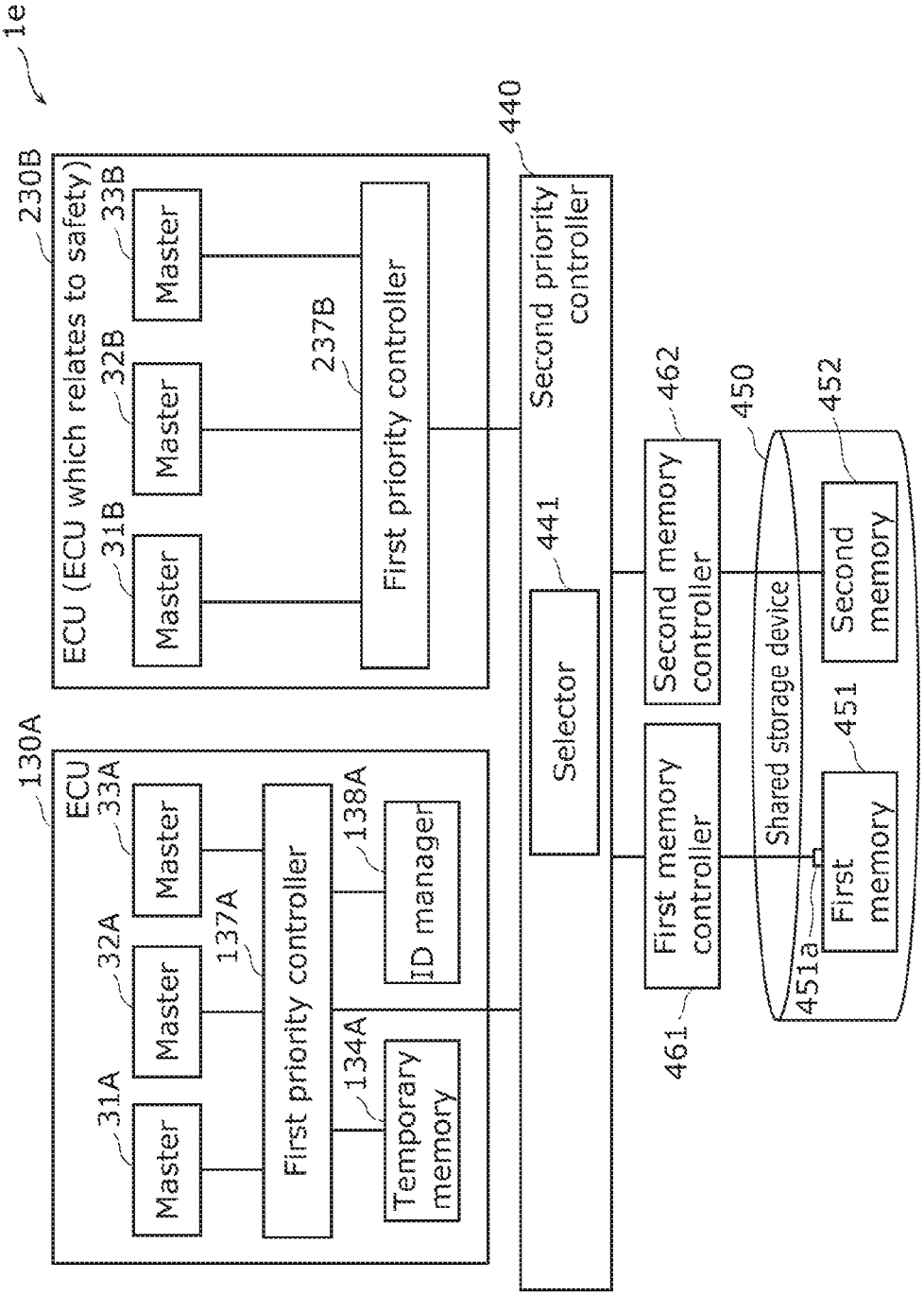
FIG. 13 is a block diagram illustrating a functional configuration of a data storage system according to Variation 2 of Embodiment 3.

The present variation describes an example in which data is written into a shared storage device including two or more memories having different properties, with reference to FIGS. 13 and 14. FIG. 13 is a block diagram illustrating a functional configuration of data storage system 1e according to the present variation.

As illustrated in FIG. 13, data storage system 1e according to the present variation includes ECUs 130A and 230B, second priority controller 440, shared storage device 450, first memory controller 461, and second memory controller 462. Data storage system 1e includes: second priority controller 440 and shared storage device 450 instead of second priority controller 240 and shared storage device 50, respectively, in data storage system 1c according to Embodiment 3, and further includes first memory controller 461 and second memory controller 462 in addition to the elements in data storage system 1c.

Second priority controller 440 includes selector 441. Selector 441 selects one of first memory 451 and second memory 452 as the destination to which each of data obtained from ECUs 130A, 230B, etc., is to be written, based on information included in each data to indicate the order of priority of the data in which the data is written into shared storage device 450. Second priority controller 440 determines one of the memories to which the date is to be written using an ID management table indicated in FIG. 14 to be described later. It is to be noted that the data is recorded in only one of first memory 451 and second memory 452.

Selector 441 outputs data to a memory controller (one of first memory controller 461 and second memory controller 462) that is connected to the memory selected.

For example, the items of information indicating the orders of priority of data obtained from the plurality of ECUs 30 are implemented by, for example, register values for QoS control included in the header parts of the respective data. By utilizing the register values for QoS control, data storage system 1e is capable of determining which one of first memory 451 and second memory 452 should be selected as the output destination without parsing data part of each data among the header part and the data part of the data. It is to be noted that the information indicating the order of priority may be, for example, an ID.

Shared storage device 450 includes a substrate (not illustrated), first memory 451, second memory 452, and connector 451a.

The substrate is a substrate (for example, a multi-layer wired substrate) on which a plurality of semiconductor memories (semiconductor memory chips) are mounted.

First memory 451 is a non-volatile semiconductor memory having a larger capacity than second memory 452. Examples of memories used as first memory 451 include multi level cell (MLC) memories and triple level cell (TLC) memories, etc., which are advantageous in terms of capacity and cost. The MLC memories are each capable of recording 2-bit information into one memory cell. The TLC memories are each capable of recording 3-bit information into one memory cell.

First memory 451 is attached to the substrate via connector 451a. First memory 451 is detachably attached to connector 451*a*. Being attachable and detachable here means that first memory 451 can be attached thereto and detached therefrom without breaking shared storage device 450 or without using a tool such as a soldering iron. In other words, first memory 451 can be easily replaced.

Second memory 452 is a non-volatile semiconductor memory having a higher durability than first memory 451. Examples of memories used as second memory 452 include pseudo single level cell (pseudo pSLC) memories and single level cell (SLC) memories, etc., which are advantageous in terms of reliability and lifetime. The pSLC memories are each a memory which supports a pSLC scheme and which is capable of recording 1-bit information into one memory cell. The SLC memories are each a memory capable of recording 1-bit information into one memory cell.

Second memory 452 is disposed on a mounting surface of the substrate. Second memory 452 is, for example, non-detachably attached to the substrate. Second memory 452 may be, for example, electrically coupled to the substrate via a bonding wire. Being non-detachably attached here means that second memory 452 cannot be attached thereto and detached therefrom without breaking shared storage device 450 or without using a tool such as a soldering iron. In other words, second memory 452 is difficult to be replaced.

It is to be noted that each of first memory 451 and second memory 452 includes a memory region which cannot be overwritten (a nonoverwritable region) and a memory region which can be overwritten (an overwritable region). The nonoverwritable region is a region in which it is impossible to execute overwriting of stored data and it is impossible to automatically execute overwriting of data by software. The nonoverwritable region is, for example, a memory region in which write protection has been placed. The overwritable region is a region in which stored data can be overwritten by another data (stated differently, the stored data can be deleted). The overwritable region is, for example, a region in which write protection has not been placed. It is to be noted that the overwritable region and the nonoverwritable region may be logically partitioned using a partitioning technique, or may be physically independent.

It is to be noted that shared storage device 450 may include three or more memories having mutually different properties.

Connector 451*a* is a connector which is attached to the mounting surface of the substrate and into which first memory 451 is detachably inserted. Non-limiting examples of connector 451*a* include a memory card connector, a universal serial bus (USB), or the like. Connector 451*a* is one example of a connector.

First memory controller 461 is connected between first memory 451 and second priority controller 440, and performs control of writing data into first memory 451. First memory controller 461 writes data output from second priority controller 440 into first memory 451.

Second memory controller 462 is connected between second memory 452 and second priority controller 440, and performs control of writing data into second memory 452. Second memory controller 462 writes data output from second priority controller 440 into second memory 452.

FIG. 14 is a diagram indicating an ID management table according to the present variation. The ID management table indicated in FIG. 14 is managed by ID manager 138A. It is to be noted that the orders of priority in an ECU which performs ASIL write are managed based on QoS register values in an interface. In FIG. 14, "pSLC/SLC memory" is a memory including at least one of a pSLC memory and an SLC memory, and corresponds to second memory 452. In addition, "MLC/TLC memory" in FIG. 14 is a memory including at least one of an MLC memory and a TLC memory, and corresponds to first memory 451.

As illustrated in FIG. 14, the ID management table is a table in which access classification, processing classification, processing details, and the order of priority are associated with each other on a per-access basis. Storage memory selection indicates which data is to be recorded into which region in which memory. It is to be noted that in FIG. 14, the overwritable region indicated is associated with an overwritable address in a semiconductor memory, and the nonoverwritable region is associated with a nonoverwritable address in the semiconductor memory.

For example, when access classification is ASIL write and processing classification is event log recording, data (event log) is data which relates to safety, and thus the data is recorded in the nonoverwritable region in second memory 452. In addition, for example, when access classification is ASIL write and processing classification is event recording, the data (video) is recorded in the nonoverwritable region in first memory 451 because the amount of the data is large although the data is data which relates to safety.

In addition, for example, access classification is non-ASIL write and processing classification is anytime log recording, data (anytime log) is data which does not relate to safety, and thus the data is recorded into the nonoverwritable region in first memory 451. In addition, for example, when access classification is non-ASIL write and processing classification is anytime recording, data (video) is data which does not relate to safety and the amount of the data is large, and thus the data is recorded into the overwritable region in first memory 451.

In addition, for example, when access classification is communication write and processing classification is download, data (downloaded data) is data which does not relate to safety but is important, and thus the data is recorded in the nonoverwritable region in second memory 452.

Selector 441 determines into which memory the data is to be stored, based on the data from ECUs 130A and 230B and the ID management table indicated in FIG. 14. In this variation, for example, selector 441 determines into which one of first memory 451 and second memory 452 the data is to be stored, based on the register values for QoS control included in the data from ECUs 130A and 230B and the ID management table indicated in FIG. 14.

It is to be noted that the overwritable region is likely to be overwritten a larger number of times and thus the lifetime thereof becomes shorter than the nonoverwritable region. Thus, selector 441 may further switch the overwritable regions in first memory 451 and second memory 452 and the nonoverwritable regions. Specifically, selector 441 may further switch the memory regions (addresses) that are used as overwritable regions in first memory 451 and second memory 452 and memory regions (addresses) that are used as nonoverwritable regions.

For example, selector 441 records the number of times of writing into each of the nonoverwritable region and the overwritable region. When updating data in the nonoverwritable region in which the number of times of writing is few, selector 441 first writes update data into an unwritten region in the nonoverwritable region. Non-limiting examples of the update data include an update program.

Next, selector 441 deletes the data in the nonoverwritable region in which before-update data is written, and switches the address into an address in an unwritten region in the overwritable region. Selector 441 may update the address in the semiconductor memory included in the storage memory selection in the ID management table indicated in FIG. 14, using the address after being switched.

Next, selector 441 switches an unwritten region in which the number of times of writing is many to a nonoverwritable region. Selector 441 may update the address in the semiconductor memory included in the storage memory selection in the ID management table indicated in FIG. 14, using the address after being switched.

In addition, the region management of shared storage device 450 may be managed by a manager (not illustrated) in shared storage device 450. The manager switches a predetermined region to a nonoverwritable region, and performs the above-described switching control in the same manner.

Embodiment 4

[4-1. Configuration of Data Storage System]

Figure 15:
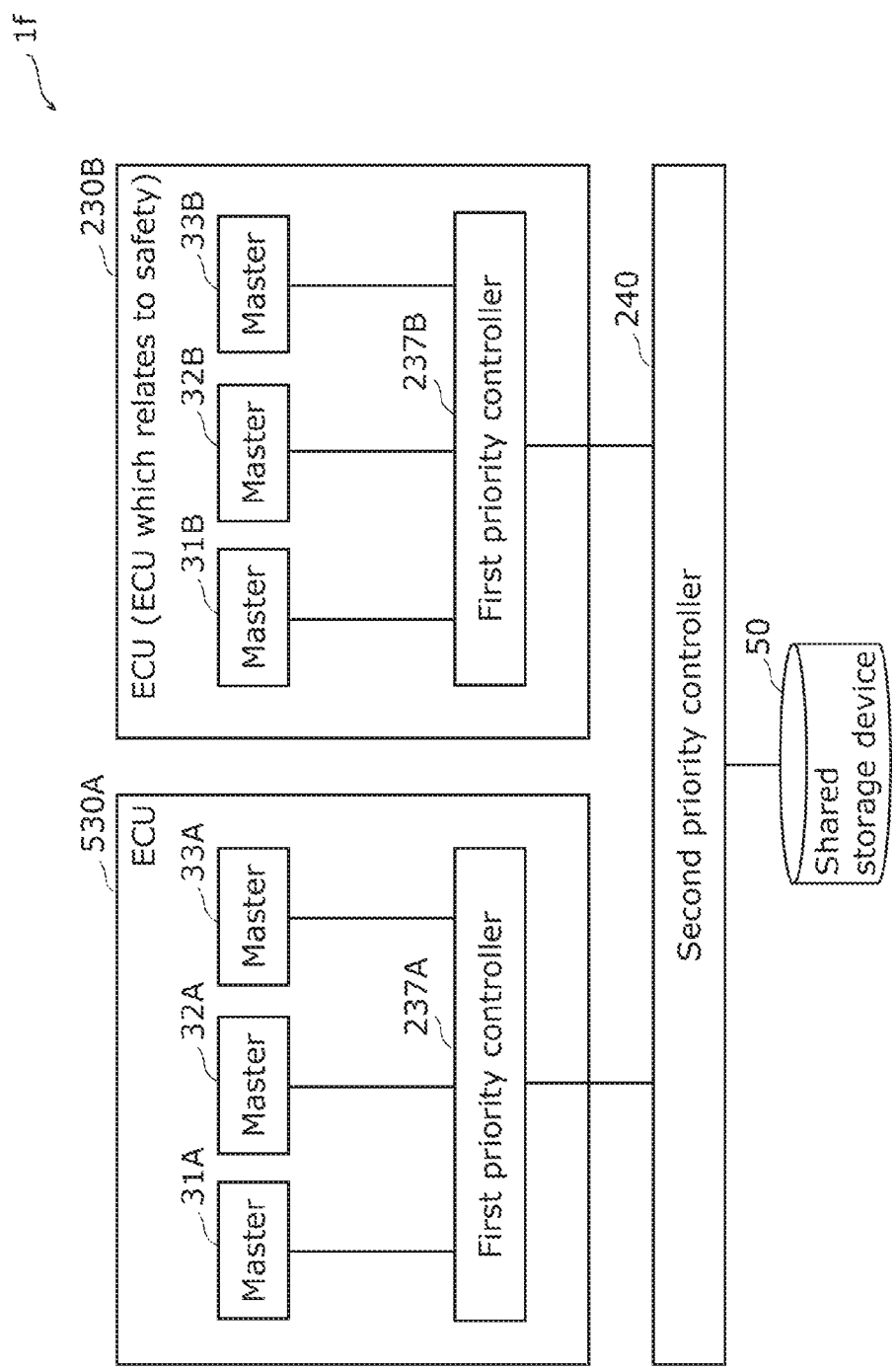
FIG. 15 is a block diagram illustrating a functional configuration of a data storage system according to Embodiment 4.

A configuration of a data storage system according to the present embodiment is described with reference to FIG. 15. FIG. 15 is a block diagram illustrating the functional configuration of data storage system if according to the present embodiment.

As illustrated in FIG. 15, data storage system if includes ECUs 530A and 230B, second priority controller 240, and shared storage device 50. Data storage system if includes ECU 530A instead of ECU 130A in data storage system 1c indicated in Embodiment 3. In data storage system if, each of ECU 530A that is an ECU which does not relate to safety and ECU 230B that is an ECU which relates to safety does not include any temporary memory.

When access and other access have collided, second priority controller 240 controls the orders of priority of the access and the other access which have collided by most prioritizing safety.

As described above, the plurality of ECUs 30 include one or more ECUs 530A (examples of first electronic controllers) and one or more ECUs 230B (examples of second electronic controllers) which relate more to safety of vehicle 1 than one or more ECUs 530A. Each of one or more ECUs 530A includes: a master which performs processing of writing first data into shared storage device 50 and a plurality of masters 31A, 32A, and 33A including a master which performs writing of second data different from the first data into shared storage device 50; and first priority controller 237A (one example of a first dedicated priority controller) which controls the orders of priority of writing data respectively from the plurality of masters 31A, 32A, and 33A into shared storage device 50. Each of one or more ECUs 230A (examples of second electronic control devices) includes: a master which performs processing of writing third data into shared storage device 50 and a plurality of masters 31B, 32B, and 33B including a master which performs writing of fourth data different from the third data into shared storage device 50; and first priority controller 237B (one example of a second dedicated priority controller) which controls the orders of priority of writing data respectively from the plurality of masters 31B, 32B, and 33B into shared storage device 50. When a collision has occurred when two or more of ECUs 30 access shared storage device 50 to write the data, second priority controller 240 (one example of a shared priority controller) controls the orders of priority by most prioritizing safety.

In this way, for example, if an accident has occurred, when ASIL write access and non-ASIL write access have collided, data storage system 1f guarantees writing by the ASIL write access and allowing loss of the data by non-ASIL write access, thereby reducing cost while reducing influence onto safety.

Embodiment 5

[5-1. Configuration of Data Storage System]

Figure 16:
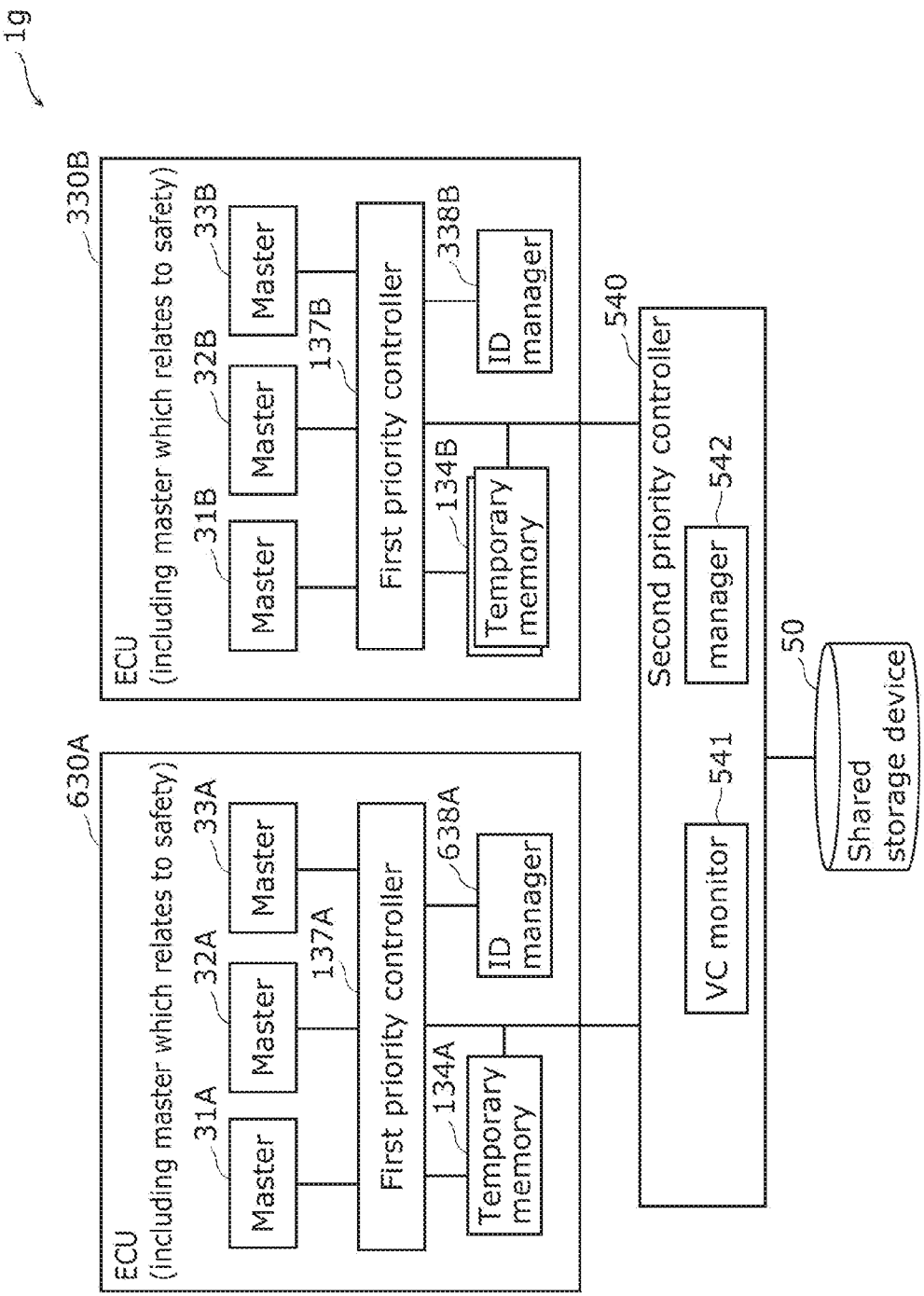
FIG. 16 is a block diagram illustrating a functional configuration of a data storage system according to Embodiment 5.

A configuration of a data storage system according to the present embodiment is described with reference to FIGS. 16 and 17. FIG. 16 is a block diagram illustrating the functional configuration of data storage system 1g according to the present embodiment. It is to be noted that hereinafter, differences from each of the embodiments are mainly described, and overlapping descriptions regarding the same as or similar to the embodiment are omitted or simplified.

As illustrated in FIG. 16, data storage system 1g includes ECUs 630A and 330B, second priority controller 540, and shared storage device 50. The present embodiment describes an example of using a PCIe interface as the interface between ECUs 630A and 330B and shared storage device 50. In other words, in the present embodiment, communication between ECUs 630A and 330B and shared storage device 50 is performed according to the PCIe standard.

A high-performance PCIe interface is likely to be employed as the interface for a shared memory in a vehicle computer that integrally manages an on-vehicle network. In addition, PCIe interfaces are also employed for "UCIe1.0" which has appeared for expanding use of chiplets. It is expected that, in the future, PCIe interfaces become the mainstream for high-performance interconnection A PCIe interface is configured to basically connect a device and a host one-to-one, but may connect a plurality of devices and a host via a switch. On the other hand, although communication is performed between a plurality of hosts (a plurality of ECUs including ECUs 630A and 330B) and a device (shared storage device 50) in the present embodiment, no standard is currently present for a case communication is performed (access is made) between the plurality of hosts and a device. For this reason, for example, when an access collision has occurred, it is assumed that the orders of priority of the plurality of hosts are assigned according to a fixed prioritization scheme or the round robin scheduling. However, in data storage system 1g for use in a vehicle, such prioritization scheme entails a possibility that data that is important in terms of safety is lost (not recorded) unintentionally. Arbitration between hosts is one solution for preventing such data loss, but such arbitration has a problem of inevitably increasing latency.

In view of this, the present embodiment describes a technique which prevents data that is important in terms of safety from being lost while using a PCIe interface as the interface in data storage system 1g for use in a vehicle.

Each of ECUs 630A and 330B is configured to include at least one master which relates to safety. For example, each of ECUs 630A and 330B has a configuration in which the master which relates to safety and a master which does not relate to safety are co-present.

First priority controller 137A in ECU 630A controls the orders of priority in which data is written from masters 31A, 32A, and 33A into shared storage device 50. First priority controller 137A controls the order of priority in which data is written from each of masters 31A to 33A into shared storage device 50, based on information indicating the order of priority of the master which has been recorded in ID manager 638A in advance.

In addition, first priority controller 137A convers the data obtained from each of the masters into frames conforming to the PCIe standard, and outputs the frames to second priority controller 540. First priority controller 137A stores the information indicating the degree of priority of the data of the master into the header parts of the frames, and outputs the frames including the information indicating the degree of priority stored therein to second priority controller 540. Specifically, first priority controller 137A stores, in each of the header parts, the information indicating the degree of priority as a virtual channel (VC) which is one of parameters in the header part. The information indicating the degree of priority of each master is recorded in ID manager 638A in advance. First priority controller 137A reads the information indicating the degree of priority from ID manager 638A, and stores the read information indicating the order of priority into the VC.

ID manager 638A records a table indicating the relationship between the master and the information indicating the degree of priority of the master. In the present embodiment, ID manager 638A records the information indicating the degree of priority of each of masters 31A to 33A. ID manager 638A is one example of a memory.

First priority controller 137B in ECU 330B controls the order of priority in which data is written from each of masters 31B, 32B, and 33B to shared storage device 50. First priority controller 137B controls the order of priority in which data is written from each of masters 31B to 33B into shared storage device 50, based on information indicating the degree of priority of the master which has been recorded in ID manager 338B in advance.

In addition, first priority controller 137B converts the data obtained from each of the masters into frames conforming to the PCIe standard, and outputs the frames to second priority controller 540. First priority controller 137B stores the information indicating the degree of priority of the data into the header parts of the frames, and outputs the frames including the information indicating the order of priority stored therein to second priority controller 540. Specifically, first priority controller 137B stores, in each of the header parts, the information indicating the order of priority into a VC which is one of parameters in the header part. The information indicating the order of priority of each master is recorded in ID manager 338B in advance. First priority controller 137B reads the information indicating the degree of priority from ID manager 338B, and stores the read information indicating the order of priority into the VC.

ID manager 338B records a table indicating the relationship between the master and the information indicating the degree of priority of the master. In the present embodiment, ID manager 338B records the information indicating the degree of priority of each of masters 31B to 33B. ID manager 338B is one example of a memory.

Second priority controller 540 includes VC monitor 541 and manager 542. In the present embodiment, second priority controller 540 functions as a PCIe switch.

VC monitor 541 is a processing unit which analyses each of the header parts of data when write access to shared storage device 50 has occurred from each of ECUs 630A and 330B. VC monitor 541 analyzes also the VC inside the header part, and monitors the value (information indicating the degree of priority) stored in the VC. VC monitor 541 is, for example, a processing unit which analyses the header part regardless of whether a write access collision has been occurred.

In addition, when a write access collision has occurred between ECUs 630A and 330B, VC monitor 541 monitors the VC (a VC analysis result) of each of the data (collision data) respectively from ECUs 630A and 330B, and performs processing of preferentially writing the data having the higher degree of priority (for example, the data having a larger value) into shared storage device 50. Since VC monitor 541 uses the information stored in the VC, VC monitor 541 is capable of determining which one of the data should be preferentially written into shared storage device 50 by only additionally executing processing of comparing the values stored in the VC in addition to the processing that VC monitor 541 originally performs.

In this way, in order to select access according to the VC analysis result, it is only necessary to add small hardware or make simple software modification only to second priority controller 540. Thus, even when communication is performed according to the PCIe standard, it is possible to provide low-cost data storage system 1g.

In addition, since VC monitor 541 uses the information stored in the VC, VC monitor 541 is capable of determining which one of the data should be preferentially written into shared storage device 50 without additionally performing communication between ECUs 630A and 330B. In other words, VC monitor 541 is capable of making the determination while preventing increase in latency.

In addition, when a write access collision has occurred between ECUs 630A and 330A and the values stored in the VCs of the respective data are the same, VC monitor 541 determines which one of the data should be preferentially written into shared storage device 50, based on ECU priority orders which have been recorded in manager 542 in advance.

In this way, even when the write access collision has occurred between ECUs 630A and 330A and the values stored in the VCs of the respective data are the same, VC monitor 541 is capable of determining which one of the data should be preferentially written into shared storage device 50.

Manager 542 records the information indicating ECU priority orders. The ECU priority orders are items of information each indicating the order of priority of a corresponding one of the plurality of ECUs. Manager 542 is configured to include, for example, a non-volatile semiconductor memory.

Here, setting of the VC values is described with reference to FIG. 17. FIG. 17 is a diagram illustrating a VC setting table according to the present embodiment.

As illustrated in FIG. 17, the VC setting table is a table in which VC, the degree of priority, access classification, processing classification, and processing details are associated with each other on a per-access basis. In FIG. 17, VCs are 0 to 7 at eight levels, and a larger VC value indicates an example in which the degree of priority is higher. For example, the degree of priority is set higher for data which is important in terms of safety. It is to be noted that VC values and the relationships between the VC values and the degrees of priority are not limited to the examples indicated in FIG. 17.

A VC value that is the degree of priority is set for each processing classification, not for each access classification. For example, in the case of the VC setting table indicated in FIG. 17, when access for event log recording and access for event image recording collide with each other, the access for event log recording having the larger VC value (having the higher degree of priority) is prioritized.

A VC value is assigned to each master in each ECU, based on the VC setting table in FIG. 17.

The data to be handled by masters 31A to 33A and the data to be handled by masters 31B to 33B are determined in advance, and thus each of the VC values according to the data to be handled is recorded in a corresponding one of ID managers 638A and 338B. For example, when the data that is handled by master 31A is data regarding an event log, the data that is handled by master 32A is data in which an event image has been recorded, and the data that is handled by master 33A is data regarding an anytime log (driving log), ID manager 638A includes a table recorded in advance in which the VC value of "7" is associated with master 31A, the VC value of "6" is associated with master 32A, and the VC value of "4" is associated with master 33A. This also applies to ID manager 338B.

[5-2. Configuration of Data Storage System]

An operation that is performed by data storage system 1g configured as described above is described with reference to FIG. 18. FIG. 18 is a flow chart indicating the operation that is performed by data storage system 1g according to the present embodiment.

As indicated in FIG. 18, when the power of vehicle 1 is turned on (for example, the ignition is turned on), second priority controller 540 reads the order-of-priority information about each of the ECUs from manager 542 to obtain the order-of-priority information (S101). In addition, each of first priority controllers 137A and 137B reads the VC information indicating the VC value of each of the masters from a corresponding one of ID managers 638A and 338A to obtain the VC information (S102). The order-of-priority information about the ECU and the VC information about the master are set, for example, in advance at the time of shipment of vehicle 1.

Next, second priority controller 540 determines whether the orders of priority of the respective ECUs have been changed or not (S103). For example, when a particular ECU among the ECUs is desired to be most prioritized, the orders of priority of the ECUs may be changed. When second priority controller 540 has obtained an instruction for changing the orders of priority of the ECUs via an input unit (not illustrated), or the like, second priority controller 540 determines that there is a change in the orders of priority of the ECUs (Yes in S103), and changes the orders of priority of the ECUs (S104). For example, second priority controller 540 updates the order-of-priority information recorded in manager 542. In addition, when second priority controller 540 has not obtained the instruction for changing the orders of priority of the ECUs via the input unit, second priority controller 540 determines that there is no change in the orders of priority of the ECUs (No in S103), and proceeds to Step S105.

Next, second priority controller 540 determines whether PCIe access has occurred (S105). When a write access from any one of the ECUs has occurred, second priority controller 540 determines that PCIe access has occurred. In the case where second priority controller 540 has determined that PCIe access has occurred (Yes in S105), second priority controller 540 proceeds to Step S106. In the opposite case where second priority controller 540 has determined that no PCIe access has occurred (No in S105), second priority controller 540 returns to Step S105 and waits for occurrence of a PCIe access.

Next, when second priority controller 540 determines that PCIe access has occurred (Yes in S105), second priority controller 540 further determines whether simultaneous access has occurred (S106). When write access from an ECU and write access from at least one other ECU have occurred at the same time, second priority controller 540 determines that simultaneous access has occurred.

When second priority controller 540 has determined that simultaneous access has occurred (Yes in S106), second priority controller 540 monitors the VCs of the collision data (S107). Specifically, VC monitor 541 of second priority controller 540 parses information in the header part of each of the collision data to obtain the VC value of the data.

Next, VC monitor 541 selects the PCIe access from the ECU having the highest degree of priority stored in the VC among the two or more ECUs each of which made simultaneous access, and stores the data into shared storage device 50 (S108).

In addition, when second priority controller 540 determines that no simultaneous access has occurred (No in S106), second priority controller 540 selects the PCIe access from a current ECU, and stores the data into shared storage 50 (S109).

In this way, when a PCIe access collision has occurred, data storage system 1g is capable of comparing the VC values and preferentially stores the data having the highest degree of priority into shared storage device 50, and thus data storage system 1g is capable of reliably storing the data that is important in terms of safety while preventing increase in latency.

Other Embodiments

Although the data storage system according to one or more aspects have been described based on the embodiments, etc., the present disclosure is not limited to the embodiments, etc. Various modifications to the above embodiments that may be conceived by those skilled in the art, as well as embodiments configured by combining different embodiments may be included in the present disclosure as long as such embodiments do not depart from the scope of the present disclosure.

For example, in each of the embodiments described above, each of the constituent elements may be implemented as dedicated hardware or implemented by executing a software program suitable for the constituent element. Each constituent element may be implemented by means of a program executer such as a CPU, a processor, or the like reading out and executing a software program recorded on a recording medium such as a hard disc or a semiconductor memory.

In addition, the order of the respective steps in each of the flow charts is an example for specifically explaining the present disclosure, and one or more orders other than the above order is also possible. Alternatively, a part of the steps may be executed at the same time as (in parallel with) a part of the other steps, or a part of the steps may not be executed.

Alternatively, the functional block division in each block diagram is one example. Thus, two or more of the functional blocks may be implemented as a single functional block, a single functional block may be split into a plurality of blocks, or a part of the functions of one or more blocks may be moved to one or more other functional blocks. Alternatively, the functions of two or more of the functional blocks having similar functions may be performed by a single hardware or software product in parallel or in time division.

The data storage system according to any of the embodiments, etc., described above may be implemented as a single device or a plurality of devices. When the data storage system is implemented by a plurality of devices, each of the constituent elements of the data storage system may be divided freely to the plurality of devices. When the data storage system is implemented as a plurality of devices, communication methods that are used between the plurality of devices are not particularly limited. Wireless communication may be used, or wired communication may be used.

Alternatively, wireless communication and wired communication may be used in combination between the plurality of devices.

In addition, each of constituent elements described in each of the above embodiments may be implemented as software, typically, as an LSI which is an integrated circuit. The constituent elements may be made as separate individual chips, or as a single chip to include a part or all thereof. Although LSI is mentioned here, designations of IC, system LSI, super LSI, and ultra LSI are used due to a difference in the degree of integration. Furthermore, the means for circuit integration is not limited to an LSI, and implementation with a dedicated circuit (a general circuit for executing a dedicated program) or a general-purpose processor is also available. It is also possible to use a field programmable gate array (FPGA) that is programmable after the LSI is manufactured, and a reconfigurable processor in which connections and settings of circuit cells within the LSI are reconfigurable. Furthermore, if integrated circuit technology that replaces LSI appear through progress in semiconductor technology or other derived technology, that technology can naturally be used to carry out integration of the constituent elements.

A system LSI is a super-multifunctional LSI manufactured by integrating a plurality of processing units onto a single chip, and is specifically a computer system configured to include a micro processor, a ROM, a RAN, etc. The ROM includes a computer program stored therein. The system LSI achieves its function by means of the micro processor operating according to a computer program.

Alternatively, each of the aspects of the present disclosure may be a computer program causing a computer to execute the unique steps included in the data storage method illustrated in any one of FIGS. 6A, 6B, and 11.

For example, the program may be a program which is intended to be executed by a computer. Alternatively, each of the aspects of the present disclosure may be a computer readable non-transitory recording medium on which such a program is recorded. For example, such a program may be recoded on a recording medium, distributed, or circulated. For example, installation of a distributed program into a device including another processor allows the device to perform the above-described processes by means of the processor executing the program.

It is assumed that assignment of the ID information in the drawings which relates to the respective embodiments, etc., is made individually for each diagram, embodiment, or variation. For example, in the drawings, the same processes assigned with different items of ID information mean similar processes.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-052111 filed on Mar. 28, 2022, and Japanese Patent Application No. 2022-159739 filed on Oct. 3, 2022.

INDUSTRIAL APPLICABILITY

The present disclosure is useful for data storage systems, etc., which store data obtained by moving bodies such as vehicles.

The invention claimed is:

1. A data storage system which is mounted on a moving body, the data storage system comprising:
   a plurality of electronic control devices which are connected to a network in the moving body;
   a shared storage device into which data is writable by each of the plurality of electronic control devices; and
   a shared priority controller which is connected between the plurality of electronic control devices and the shared storage device, and controls an order of priority in which data is written into the shared storage device from each of the plurality of electronic control devices,
   wherein communication is performed between the plurality of electronic control devices and the shared storage device according to the peripheral component interconnect express (PCIe) standard, and
   wherein the shared priority controller includes a VC monitor which monitors a virtual channel (VC) analysis result of collision data when a collision has occurred when the two or more of the plurality of electronic control devices access the shared storage device to write the data of the two or more of the plurality of electronic control devices, and
   wherein the VC monitor controls the order of priority in which data is written into the shared storage device based on the VC analysis result of the collision data when the collision has occurred when the two or more of the plurality of electronic control devices access the shared storage device to write the data.

2. The data storage system according to claim 1,
   wherein each of the plurality of electronic control devices includes:
   a plurality of masters including a first master which performs write processing of first data into the shared storage device, and a second master which performs write processing of second data into the shared storage device, the second data being different from the first data;
   a plurality of temporary memories which are connected respectively to the plurality of masters; and
   a dedicated priority controller which controls the order of priority in which data is written into the shared storage device from each of the plurality of masters.

3. The data storage system according to claim 1,
   wherein the plurality of electronic control devices includes one or more first electronic control devices, and
   each of the one or more first electronic control devices includes:
   a plurality of first masters including a first master which performs write processing of first data into the shared storage device, and a first master which performs write processing of second data into the shared storage device, the second data being different from the first data;
   a first temporary memory into which data of each of the plurality of first masters is writable; and
   a first dedicated priority controller which is connected to the plurality of first masters and to the first temporally memory, and includes a first dedicated priority controller which controls the order of priority in which data is written into the shared storage device from each of the plurality of first masters.

4. The data storage system according to claim 3, wherein each of the one or more first electronic control devices includes a first manager which manages first priority information in which a type of data and the order of priority in which data is written into the shared storage device is associated with each other, and when a collision occurs when the two or more of the plurality of first masters access the shared storage device to write the data, based on the first priority information, the first dedicated priority controller controls the order of priority in which data is written.

5. The data storage system according to claim 4, wherein when the collision occurs when the two or more of the plurality of first masters access the shared storage device to write the data, based on the first priority information, the first dedicated priority controller assigns, to low-priority data which has a low order of priority, information indicating an order of priority of the low-priority data, and writes the low-priority data into the first temporary memory.

6. The data storage system according to claim 4, wherein the first temporary memory includes memory regions which have been divided on a per-data basis in advance, and when the collision occurs when the two or more of the plurality of first masters access the shared storage device to write the data, based on the first priority information, the first dedicated priority controller writes low-priority data which has a low order of priority into a memory region corresponding to the low-priority data in the first temporary memory.

7. The data storage system according to claim 3, wherein the plurality of electronic control devices includes one or more second electronic control devices which relate more to safety of the moving body than the one or more first electronic control devices, and each of the one or more second electronic control devices includes:

a plurality of second masters including a second master which performs write processing of third data into the shared storage device, and a second master which performs write processing of fourth data into the shared storage device, the fourth data being different from the third data; and a second dedicated priority controller which controls the order of priority in which data is written into the shared storage device from each of the plurality of second masters.

8. The data storage system according to claim 7, wherein each of the one or more second electronic control devices includes a second manager which manages second priority information in which a type of data and the order of priority in which data is written into the shared storage device is associated with each other, and when a collision occurs when the two or more of the plurality of second masters access the shared storage device to write the data, based on the second priority information, the second dedicated priority controller controls the order of priority in which data is written.

9. The data storage system according to claim 8, further comprising:

a second temporary memory into which data of each of the plurality of second masters is writable, wherein the second temporary memory is duplexed.

10. The data storage system according to claim 8, wherein the second dedicated priority controller controls the order of priority by most prioritizing safety when the collision occurs when the two or more of the plurality of second masters access the shared storage device to write the data.

11. The data storage system according to claim 1, wherein the plurality of electronic control devices includes:

one or more first electronic control devices; and one or more second electronic control devices which relate more to safety of the moving body than the one or more first electronic control devices, each of the one or more first electronic control devices includes:

a plurality of masters including a first master which performs write processing of first data into the shared storage device, and a first master which performs write processing of second data into the shared storage device, the second data being different from the first data; and a first dedicated priority controller which controls the order of priority in which data is written into the shared storage device from each of the plurality of first masters, each of the one or more second electronic control devices includes:

a plurality of second masters including a second master which performs write processing of third data into the shared storage device, and a second master which performs write processing of fourth data into the shared storage device, the fourth data being different from the third data; and a second dedicated priority controller which controls, by most prioritizing safety, the order of priority in which data is written into the shared storage device from each of the plurality of second masters, and the shared priority controller controls the order of priority by most prioritizing safety when a collision occurs when the two or more of the plurality of electronic control devices access the shared storage device to write the data of the two or more of the plurality of electronic control devices.

12. The data storage system according to claim 1, wherein the shared priority controller includes:

a determiner which determines whether data obtained from each of the plurality of electronic control devices is log data; and an aggregator which aggregates data which has been determined to be log data by the determiner, and writes the data aggregated collectively into the shared storage device.

13. The data storage system according to claim 1, wherein the shared storage device includes a first memory and a second memory, the first memory has a larger capacity than the second memory, and the second memory is more durable than the first memory.

14. The data storage system according to claim 13, wherein the shared priority controller further includes a selector which selects one of the first memory and the second memory as a destination into which data obtained from each of the plurality of electronic control devices is to be written, based on the information indicating the order of priority in which data is written into the shared storage device, the information being included in the data obtained from each of the plurality of electronic control devices.

15. The data storage system according to claim 14,
wherein the information indicating the order of priority is indicated as a register value for quality of service (QoS) control included in the data obtained from each of the plurality of electronic control devices.

16. The data storage system according to claim 13,
wherein the shared storage device includes a substrate and a connector,
the first memory is detachably attached to the substrate via the connector, and
the second memory is non-detachably attached to the substrate.

17. A data storage system which is mounted on a moving body, the data storage system comprising:
a plurality of electronic control devices which are connected to a network in the moving body, each of the plurality of electronic control devices including:
a plurality of masters including a first master which performs write processing of first data into the shared storage device, and a second master which performs write processing of second data into the shared storage device, the second data being different from the first data;
a plurality of temporary memories which are connected respectively to the plurality of masters; and
a dedicated priority controller which controls the order of priority in which data is written into a shared storage device from each of the plurality of masters, wherein data is writable into the shared storage device by each of the plurality of electronic control devices; and
a shared priority controller which is connected between the plurality of electronic control devices and the shared storage device, and controls an order of priority in which data is written into the shared storage device from each of the plurality of electronic control devices,
wherein communication is performed between the plurality of electronic control devices and the shared storage device according to the peripheral component interconnect express (PCIe) standard, and
the dedicated priority controller:
after obtaining the first data from the first master, stores first information according to the first master into a virtual channel (VC) of a header part of the first data; and
after obtaining the second data from the second master, stores second information according to the second master into a VC of a header part of the second data.

18. A data storage system which is mounted on a moving body, the data storage system comprising:
a plurality of electronic control devices which are connected to a network in the moving body and which includes one or more first electronic control devices, each of the one or more first electronic control devices including:
a plurality of first masters including a first master which performs write processing of first data into the shared storage device, and a first master which performs write processing of second data into a shared storage device, the second data being different from the first data, wherein data is writable into the shared storage device by each of the plurality of electronic control devices;
a first temporary memory into which data of each of the plurality of first masters is writable; and
a first dedicated priority controller which is connected to the plurality of first masters and to the first temporary memory, and includes a first dedicated priority controller which controls the order of priority in which data is written into the shared storage device from each of the plurality of first masters; and
a shared priority controller which is connected between the plurality of electronic control devices and the shared storage device, and controls an order of priority in which data is written into the shared storage device from each of the plurality of electronic control devices,
wherein the one or more first electronic control devices and the shared storage device perform communication according to the PCIe standard,
the first dedicated priority controller:
after obtaining the first data from the first master which performs write processing of the first data into the shared storage device, stores first information according to the first master into a virtual channel (VC) of a header part of the first data; and
after obtaining the second data from the first master which performs write processing of the second data into the shared storage device, stores second information according to the first master into a VC of a header part of the second data.

\* \* \* \* \*